US012705757B2

(12) United States Patent
Aimufua et al.

(10) Patent No.: US 12,705,757 B2
(45) Date of Patent: Aug. 11, 2026

(54) METHODS AND SYSTEMS FOR DISCRIMINATING BETWEEN OBJECTS OF INTEREST AND BACKGROUND IN IMAGES

(71) Applicant: Thales Holdings UK Plc, Reading (GB)

(72) Inventors: Martins Aimufua, Reading (GB); Paul Hughes, Reading (GB); Paul Berry, Reading (GB)

(73) Assignee: Thales Holdings UK Plc, Reading (GB)

( * ) Notice: Subject to any disclaimer, the term of this patent is extended or adjusted under 35 U.S.C. 154(b) by 379 days.

(21) Appl. No.: 18/470,503

(22) Filed: Sep. 20, 2023

(65) Prior Publication Data

US 2024/0104745 A1 Mar. 28, 2024

(30) Foreign Application Priority Data

Sep. 20, 2022 (GB) ..................................... 2213731

(51) Int. Cl.

*G06T 7/194* (2017.01)
*G06T 5/50* (2006.01)
*G06V 10/25* (2022.01)
*G06V 10/60* (2022.01)
*G06V 10/75* (2022.01)
*G06V 10/764* (2022.01)

(52) U.S. Cl.

CPC ................ *G06T 7/194* (2017.01); *G06T 5/50* (2013.01); *G06V 10/25* (2022.01); *G06V 10/60* (2022.01);

(Continued)

(58) Field of Classification Search

CPC . G06T 2207/20224; G06T 5/50; G06T 7/194; G06T 7/254; G06T 7/97;

(Continued)

(56) References Cited

U.S. PATENT DOCUMENTS

2011/0150282 A1* 6/2011 Gupta .................... G06V 20/52 382/103
2011/0243451 A1 10/2011 Oyaizu (Continued)

FOREIGN PATENT DOCUMENTS

JP H10312448 A 11/1998
JP 2017163374 9/2017

OTHER PUBLICATIONS

UK Combined Search and Examination Report for corresponding Application No. GB2213731.9, dated Mar. 20, 2023, 6 pages.

(Continued)

*Primary Examiner* — Gregory A Morse
*Assistant Examiner* — Stefano Anthony Dardano
(74) *Attorney, Agent, or Firm* — Dority & Manning, P.A.

(57) ABSTRACT

A method comprising: receiving a first image captured on an image sensor; obtaining a scene estimate for the first image, wherein the scene estimate comprises an estimate of the background signal for a region of space being imaged onto the sensor; storing the scene estimate in memory; receiving a plurality of successive images, wherein for each one of the successive images, the field of view is shifted with respect to the preceding image and overlaps partially with that of the preceding image; for each one of the successive images: retrieving the scene estimate from memory; subtracting the scene estimate from the image to obtain a background-subtracted image for output; updating the scene estimate based on the signal detected at the location on the image sensor to which the region of space is being imaged; and replacing the scene estimate stored in memory with the updated scene estimate.

17 Claims, 22 Drawing Sheets

(52) U.S. Cl.
CPC .......... *G06V 10/751* (2022.01); *G06V 10/764* (2022.01); *G06T 2207/20224* (2013.01)

(58) Field of Classification Search
CPC ... G06T 2207/10016; G06T 3/18; G06T 7/20; G06T 7/55; G06V 10/25; G06V 10/751; G06V 10/60; G06V 10/764; G06V 10/247; G06V 10/62; G06V 20/13; G06V 20/17; G06V 20/46; G06V 2201/07; G06V 10/10; G06V 10/7715
See application file for complete search history.

(56) References Cited

U.S. PATENT DOCUMENTS

| | | | | |
|---|---|---|---|---|
| 2013/0129144 | A1* | 5/2013 | Chang | G06T 7/337<br>382/173 |
| 2016/0073063 | A1* | 3/2016 | Peret | A61M 5/16877<br>348/160 |
| 2017/0206423 | A1* | 7/2017 | Ju | G06T 7/254 |
| 2018/0130205 | A1* | 5/2018 | Chen | G06T 7/12 |
| 2019/0180427 | A1* | 6/2019 | Han | G06T 3/12 |
| 2019/0325580 | A1* | 10/2019 | Lukac | G06T 3/4038 |
| 2020/0364877 | A1* | 11/2020 | Bradski | G06T 7/155 |
| 2022/0207750 | A1* | 6/2022 | Li | G06V 20/58 |

OTHER PUBLICATIONS

Examination Report for corresponding Application No. GB2213731.9, dated Aug. 30, 2024, 3 pages.

Extended European Search Report for corresponding Application No. 23198517.7, dated Dec. 15, 2023, 11 pages.

Viswanath, Amitha et al., “Background Modelling from a Moving Camera”, Procedia Computer Science, vol. 58, Jan. 1, 2025, pp. 289-296.

* cited by examiner

| Region | Column ranges | Allowable change in region |
| --- | --- | --- |
| A | $1\ to \left(\frac{width}{2} - 3\right)$<br>$\left(\frac{width}{2} + 2\right) to\ width$ | $-2\hat{}12 \leq \delta u \leq 2\hat{}12$ |
| B | $\left(\frac{width}{2} - 2\right) to \left(\frac{width}{2} + 1\right)$ | $\delta u = 0$ |

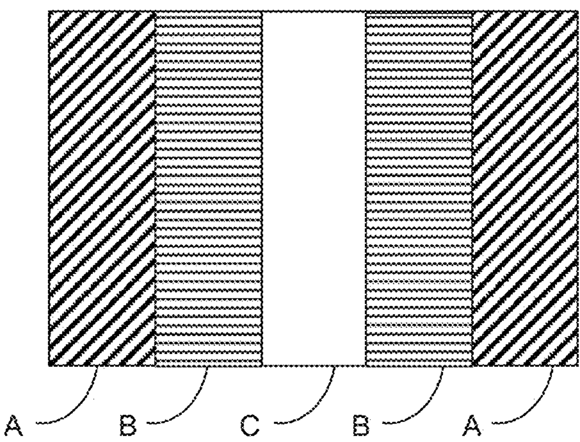

| Region | Column ranges | Allowable change in region |
|---|---|---|
| A | $1\ to \left(\frac{width}{4} - 1\right)$<br>$\left(\frac{3 * width}{4} + 1\right) to\ width$ | $-2^{\wedge}14 \leq \delta u \leq 2^{\wedge}14$ |
| B | $\left(\frac{width}{4}\right) to \left(\frac{width}{2} - 3\right)$<br>$\left(\frac{width}{2} + 2\right) to \left(\frac{3 * width}{4}\right)$ | $-2^{\wedge}12 \leq \delta u \leq 2^{\wedge}12$ |
| C | $\left(\frac{width}{2} - 2\right) to \left(\frac{width}{2} + 1\right)$ | $\delta u = 0$ |

Fig. 9

METHODS AND SYSTEMS FOR DISCRIMINATING BETWEEN OBJECTS OF INTEREST AND BACKGROUND IN IMAGES

FIELD

Embodiments described herein relate to an image processor and methods for processing images using such a processor.

BACKGROUND

Locating objects of interest in images, and tracking the movement of those objects across time, is an important task in computer vision. The task is made difficult, however, where there is low contrast between the object(s) of interest and the background. This is even more true where the field of view itself is not stationary.

A number of theoretical algorithmic solutions have been proposed for discriminating foreground objects of interest from background regions of an image. However, many of these algorithms are computationally intensive and do not lend themselves readily to implementation in hardware. Such approaches require multiple passes of individual frames, coupled with computationally heavy steps, such as feature detection or RANSAC (Random sample consensus) used to establish consensus between the salient points of the image to determine the background, or the implementation of tracking algorithms.

It is desirable, therefore, to provide improved means for discriminating between object(s) of interest and background regions in images, particularly across sequences of frames in which the field of view does not remain stationary.

SUMMARY

According to a first aspect of the present invention, there is provided a method comprising:

- receiving a first image captured on an image sensor,
- obtaining a scene estimate for the first image, wherein the scene estimate comprises an estimate of the background signal for a region of space being imaged onto the sensor;
- storing the scene estimate in memory;
- receiving a plurality of successive images, wherein for each one of the successive images, the field of view is shifted with respect to the preceding image and overlaps partially with that of the preceding image,
- for each one of the successive images:
  - retrieving the scene estimate from memory;
  - subtracting the scene estimate from the image to obtain a background-subtracted image for output;
  - updating the scene estimate based on the signal detected at the location on the image sensor to which the region of space is being imaged; and
  - replacing the scene estimate stored in memory with the updated scene estimate.

The image sensor may comprise an array of pixels and the scene estimate comprise an array of values, each value comprising an estimate of the background signal for a point in space being imaged onto a respective one of the pixels.

The method may comprise:

- prior to subtracting the scene estimate from the image to obtain the background-subtracted image:
  - determining a location on the image sensor to which the region of space is being imaged by determining a shift in the field of view of the image sensor to have taken place since the scene estimate was last updated; and
  - applying a corresponding shift to the scene estimate, such that when the scene estimate is overlaid with the image, the estimate of the background signal for each point in space coincides with the location on the image sensor to which the respective point in space is being imaged.

The background-subtracted image may comprise an array of values, each value indicating the difference between the intensity value of a pixel in the image and the estimated background signal for that pixel.

Updating the scene estimate may further comprise:

- determining a value of the background-subtracted image for the location on the image sensor to which the region of space is being imaged;
- if a magnitude of the value of the background-subtracted image is below a pre-defined threshold value, updating the scene estimate based on the value of the background-subtracted image; and
- if the magnitude of the value of the background-subtracted image is equal to or above the pre-defined threshold value, updating the scene estimate based on the threshold value.

Updating the scene estimate based on the value of the background-subtracted image may comprise adding the value of the background estimate to the scene estimate; and

- updating the scene estimate based on the threshold value comprises adding the value of the threshold to the scene estimate.

The pre-defined threshold value may vary depending on the location on the image sensor to which the region of space is being imaged.

The image sensor may comprise a first set of pixels classified as a region of interest and a second set of pixels classified as a background region, wherein the pre-defined threshold is lower for pixels in the first set of pixels than for pixels in the second set of pixels.

The pre-defined threshold may be zero for pixels in the region of interest.

For each received image, a portion of the field of view may be more intensely illuminated than the rest of the field of view, wherein the region of interest corresponds to the portion of the field of view that is more intensely illuminated.

For each received image, the signal from a portion of the field of view may be attenuated by a filter, wherein the background region corresponds to the portion of the field of view for which the signal is attenuated.

At least a portion of the background region may lie between the region of interest and an edge of the field of view, wherein within said portion, the pre-defined threshold is higher for pixels that lie closer to the edge of the field of view than for pixels of that lie closer to the region of interest.

For each one of the successive images, the field of view may be shifted in the same direction. Said edge may be the leading edge of the field of view.

The region of interest may comprise two or more adjacent rows or columns of pixels on the image sensor, and the background region may comprise the remaining pixels on the image sensor.

The method may comprise normalising the background-subtracted image prior to outputting the background-subtracted image.

A low-pass filter may be applied to the background-subtracted image prior to outputting the background-subtracted image.

Applying the low pass-filter to the background-subtracted image may comprise:

- determining an intensity of the background-subtracted image at the location on the image sensor to which the region of space is being imaged;
- determining whether the intensity is below a threshold intensity and if so, setting the value of the intensity in the background-subtracted image at the location to zero.

The threshold intensity may be defined as a percentage of the estimated background signal for the region of space in the updated scene estimate.

According to a second aspect of the present invention, there is provided a computer readable medium having stored thereon computer executable instructions that, when executed by a computer, will cause the computer to carry out a method according to the first aspect of the present invention.

According to a third aspect of the present invention, there is provided an image processor configured to carry out a method according to the first aspect of the present invention.

As discussed in more detail below, embodiments described herein can help to enhance the contrast in image frames by enhancing the foreground constituted by object(s) of interest, as well as supressing the background in order to accentuate the desired features. More specifically, embodiments provide for an accurate estimation of a background in the case where the field of view of the camera does not remain static, but changes over time.

BRIEF DESCRIPTION OF DRAWINGS

Embodiments of the invention will now be described by way of example with reference to the accompanying drawings in which:

FIG. 9 shows examples of thresholds to be applied at different points across an image in a method according to an embodiment;

DETAILED DESCRIPTION

Figure 1:
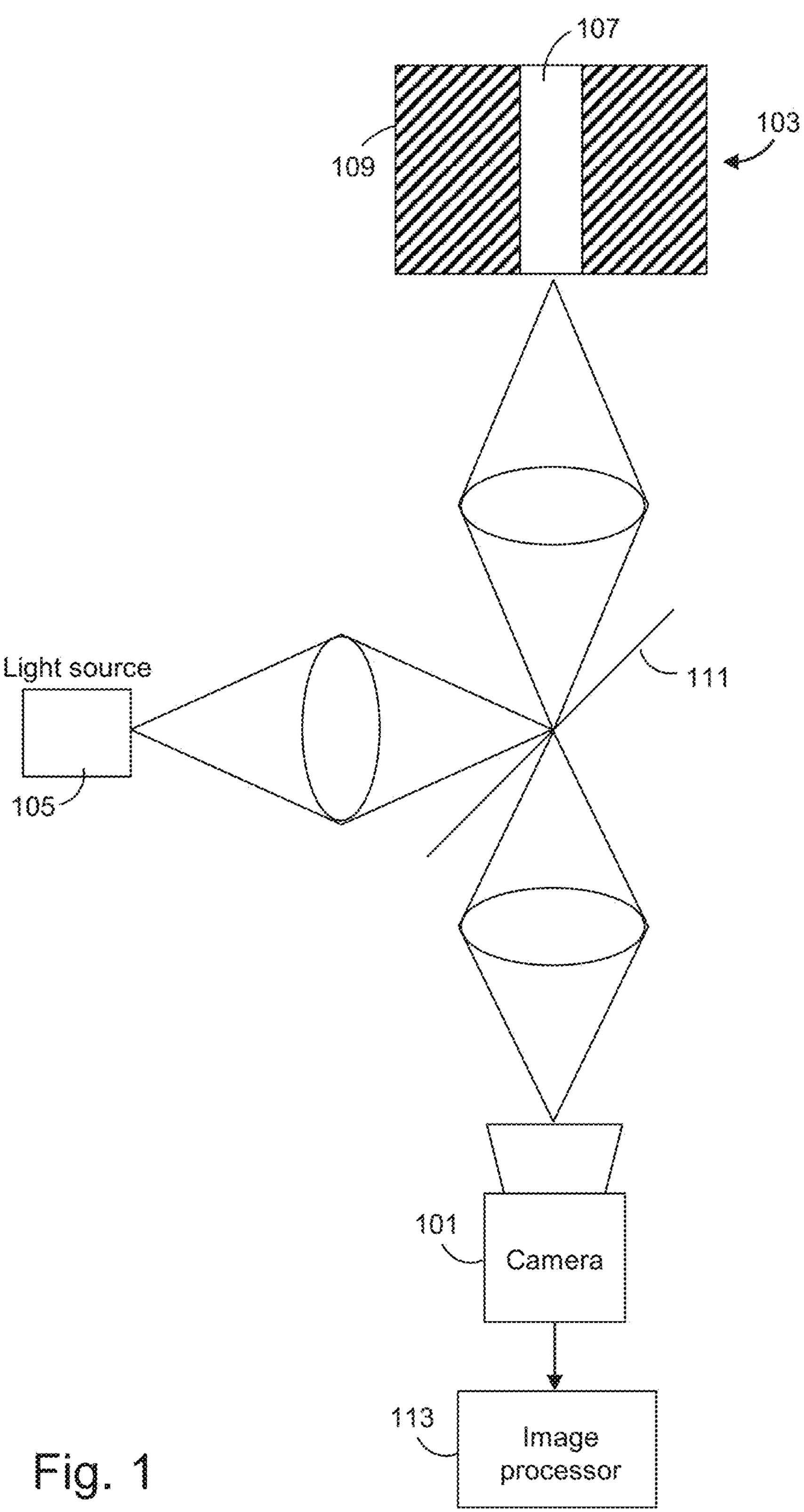
FIG. 1 shows an optical system comprising an image processor according to an embodiment.

FIG. 1 shows a schematic of an optical system according to an embodiment. The system comprises an image sensor 101 that is arranged to capture an image of a field of view 103. The image sensor 101 may be one of a number of different types of sensor, including a CCD or CMOS camera having an array of camera pixels. A light source 105 is arranged to illuminate a region of interest 107 in the field of view, whilst the remaining area 109 of the field of view is designated as a background region. In the present embodiment, the light from the source 105 is directed towards the field of view 103 by a partially reflective mirror 111, with the signal from the field of view passing through the mirror to the image sensor 101. It will, however, be appreciated that other optical configurations are possible.

The illuminated portion 107 of the field of view is imaged onto a first set of pixels of the image sensor 101, whilst the background region 109 is imaged onto a second set of pixels of the image sensor. Images captured by the image sensor are processed and output by an image processor 113.

The light source 105 may be an incandescent lamp, LED or laser source, with a wavelength band that lies anywhere from the ultraviolet to the far infra-red portion of the spectrum. The image sensor 101 is chosen so as to be responsive to light in that wavelength band.

Figure 2:
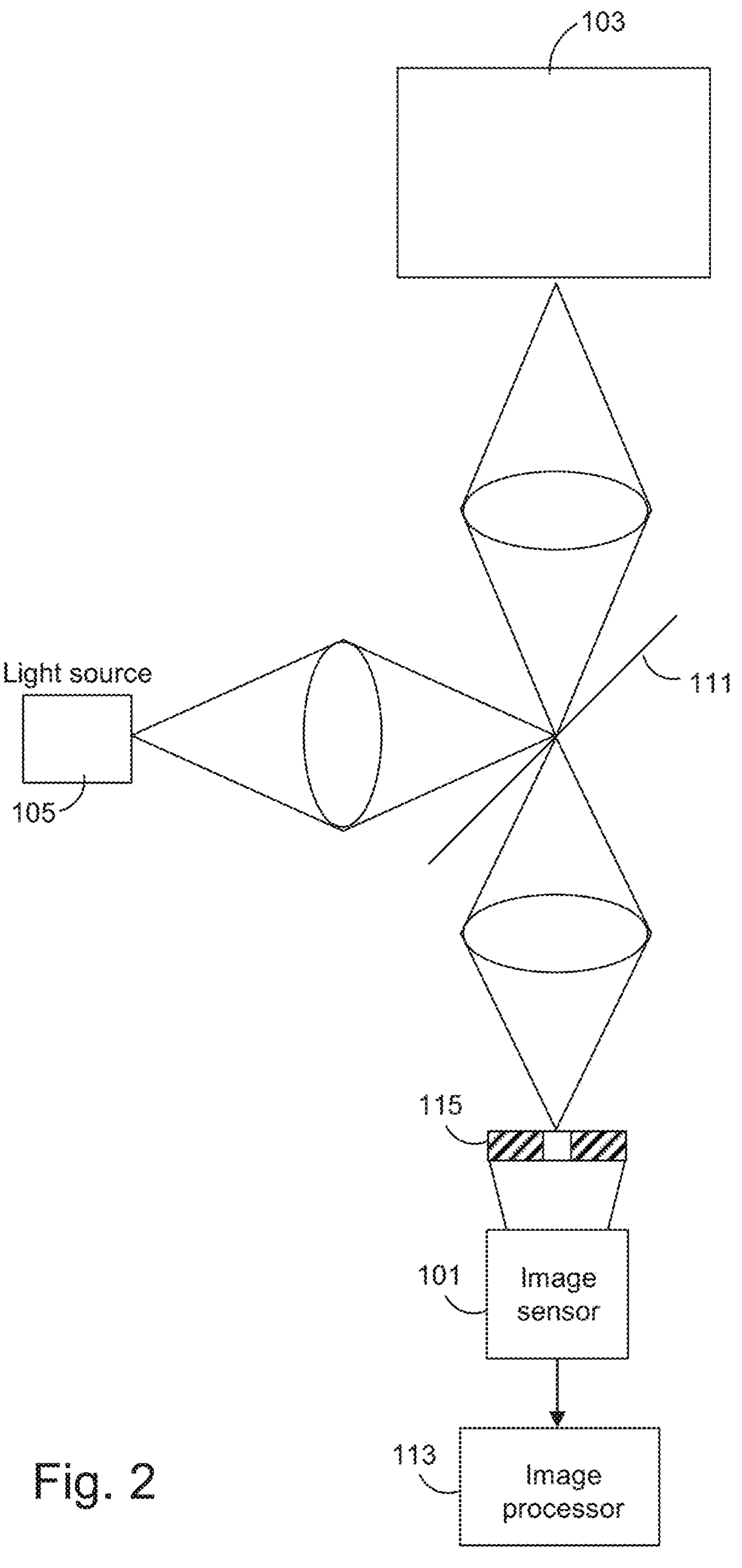
FIG. 2 shows another optical system comprising an image processor according to an embodiment.

FIG. 2 shows a schematic of an optical system according to another embodiment. The system comprises a similar arrangement to that shown in FIG. 1, but in this case, the field of view 103 is illuminated uniformly by the light source 105. A neutral density (ND) filter 115 is placed in the optical path ahead of the image sensor and used to attenuate the signal received from parts of the field of view. The ND filter 115 attenuates the signal from the background region to a greater degree than from the region of interest. As in the system of FIG. 1, the signal from the region of interest is captured on a first set of pixels of the image sensor, whilst the signal from the background region (and which is attenuated to a greater extent by the ND filter 115) is captured on a second set of pixels of the image sensor. Images captured by the image sensor are again processed and output by the image processor 111.

It will be appreciated that in both FIG. 1 and FIG. 2, the image captured on the image sensor will tend to have a higher signal from the region of interest, owing to the preferential illumination of that region in FIG. 1, and the attenuation of light from the background region in FIG. 2.

Figure 3:
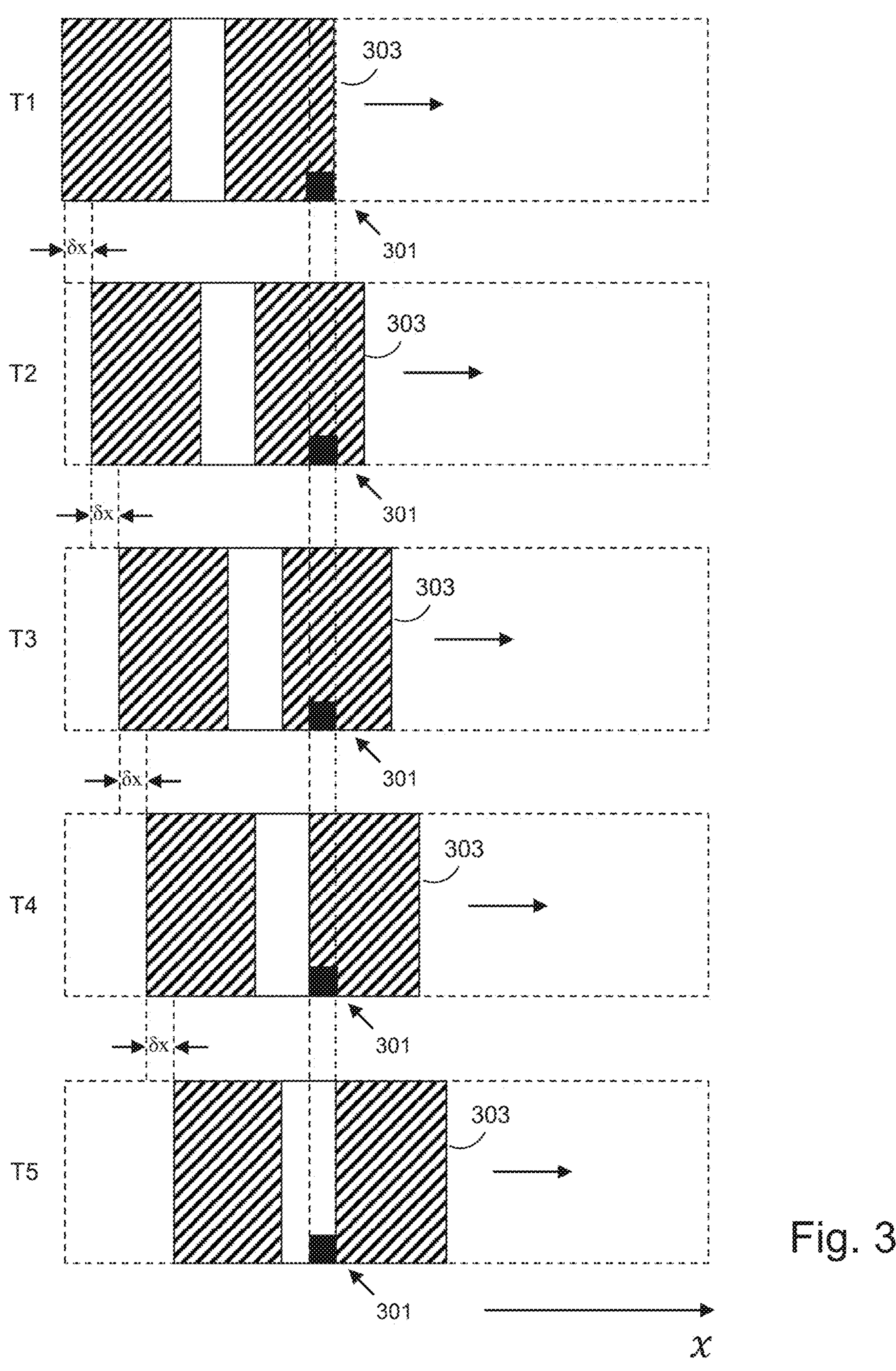
FIG. 3 shows an example of how by shifting the field of view of an image sensor, the same region of space is imaged onto different points of the image sensor at different points in time.

The field of view may be shifted by moving one or more components of the optical system, such as by tilting the mirror 111 or by translating the image sensor 101 in space, for example. In the embodiments described herein, the frame rate i.e. the rate at which successive images are captured on the image sensor, is much higher than the motion scan rate i.e. the rate at which the field of view is shifted to cover an entirely new region of space. The frame rate may, for example, be of the order of 8,000-10,000 frames per second (fps) (c.f. video frame rates of 30-40 fps). As a result, there is significant overlap between the regions of space captured in successive frames, with the same region of space being captured each time but being imaged onto a different pixel or group of pixels on the image sensor. This can be further understood with reference to FIG. 3, which shows how by shifting the field of view, the same region of space 301 is imaged onto different points of the image sensor at different points in time. In this example, the region of interest comprises a central column of the field of view and the field of view is shifted in a direction x that is perpendicular to that central column. The edge 303 marks the leading edge of the field of view in the direction of movement. As the field of view shifts, the region of interest is also shifted, remaining in the same central portion of the field of view.

Beginning at time T1, the image sensor captures an image of a first field of view. At this point, light from a region of space 301 contained within the background region is imaged onto the sensor at a first location. At a subsequent time point T2, the field of view has shifted by a distance ox relative to the field of view captured at T1. As a result of the shift in the field of view, light from the region of space 301 is now being imaged onto the sensor at a second location, which is separated from the first location by the same distance δx but in the opposite direction. The light from the region of space 301 is still contained within the background region of the image, but lies closer to the region of interest. Continuing at time T3, the field of view is shifted by a further distance δx relative to time T2. The region of space 301 is now being imaged onto the sensor at a location that is shifted by the same distance δx relative to T2, again in the opposite direction. At time T4, the field of view is shifted by a further distance δx relative to time T3. Here, the region of space 301 is still contained within the background region of the image, but lies adjacent to the region of interest at the centre of the image. At time T5, the field of view is shifted by a further distance δx relative to time T4. At this point, the region of space 301 is now contained within the region of interest in the image.

In embodiments described herein, the signal received from the background region from successive images is used by the image processor to estimate the background signal in the region of interest as the field of view being imaged onto the camera changes over time. Here, the "commonality" in the frames can be exploited to "look ahead", shift and then subtract the common elements of the former frames to remove the background present in the region of interest. Given the known path of the panning motion/translation of the optical system and the extent to which the current frame overlaps with the previous frame, the image processor is able to average across multiple frames to obtain a more accurate estimation of the signal in the region of interest.

Figure 4:
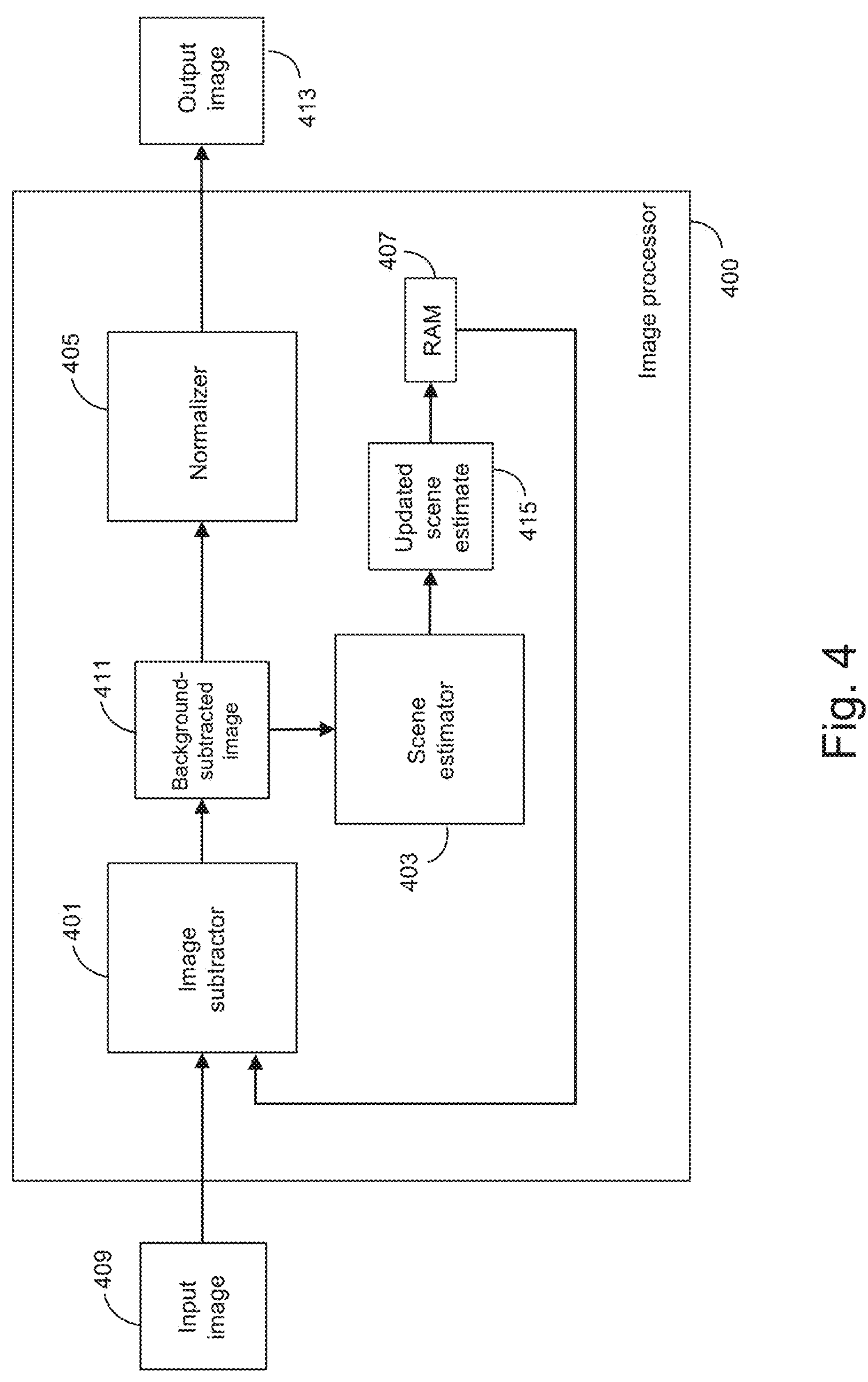
FIG. 4 shows a schematic of an image processor according to an embodiment.

The function of the image processor will now be described in more detail with reference to FIGS. 4 to 10. Referring to FIG. 4, the image processor 400 comprises an image subtractor 401, a scene estimator 403, a normalizer 405 and a short term memory (RAM) 407. For each image 409 captured on the image sensor, the scene estimator 403 is configured to output a scene estimate comprising an estimate of the background signal for region(s) of space being imaged onto the sensor. The image subtractor 401 subtracts the scene estimate from the received image 409 to generate a background-subtracted image 411. The normalizer 409 is used to normalize the background-subtracted image in order to exploit the full dynamic range of the image processor, resulting in a final output image 413.

In order to enhance the accuracy with which the scene estimator estimates the background signal in the region of interest, the scene estimate is updated each time a new input image is received. Thus, the process of determining the background signal for a region of space present in the field of view is an iterative process that takes account of the information contained in previous images in which the same region of space was present, but at a different location in the field of view. The scene estimator uses the information in the background-subtracted image to update the scene estimate, with the updated scene estimate 415 then replacing the previous scene estimate in the short term memory 407. On receipt of the next image from the image sensor, the updated scene estimate is retrieved from the RAM, ready to be subtracted from that image, and the process of updating the scene estimate is repeated.

Figure 5:
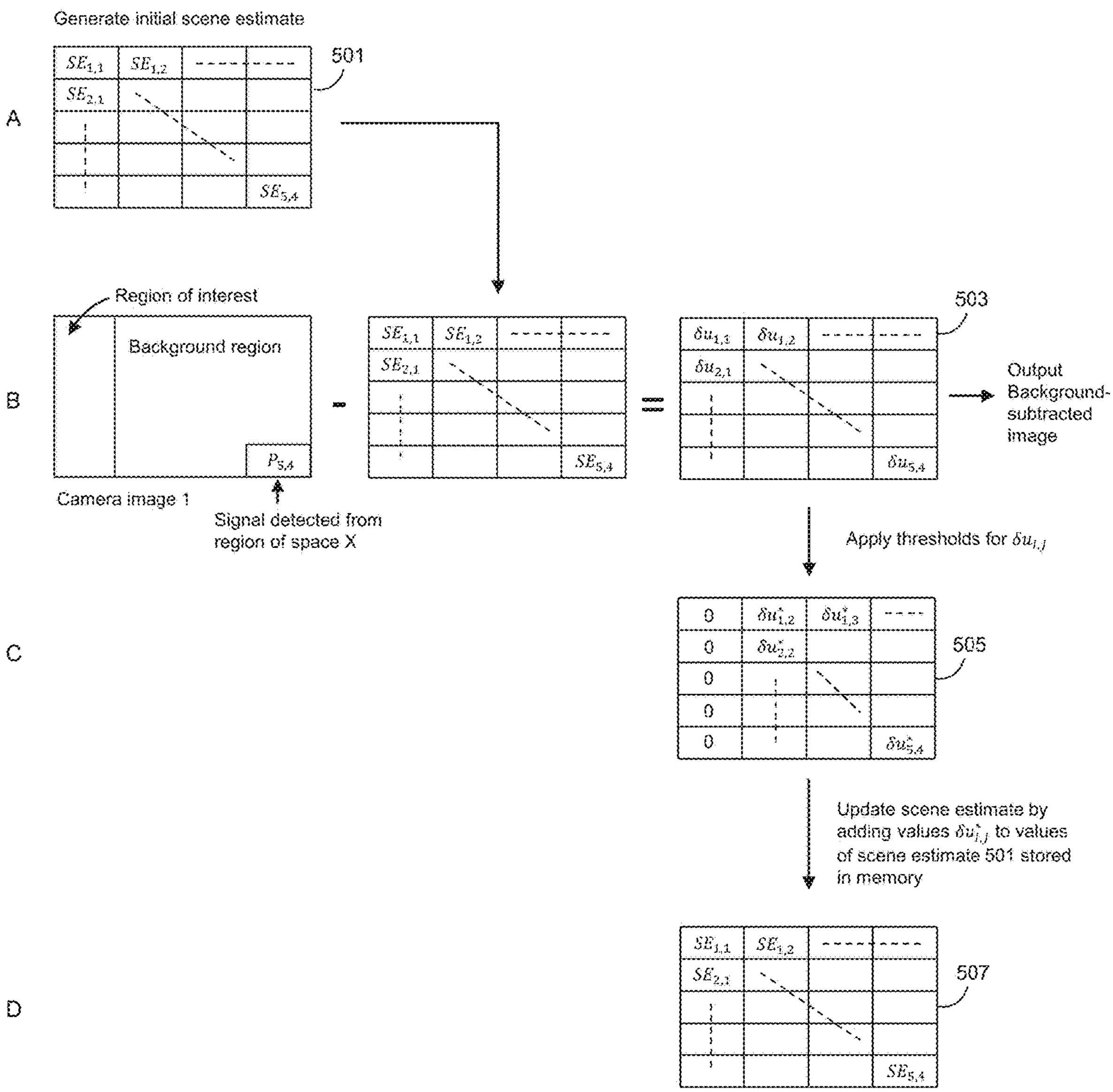
FIG. 5 shows an example of how a first scene estimate is generated in a method according to an embodiment.
Figure 6:
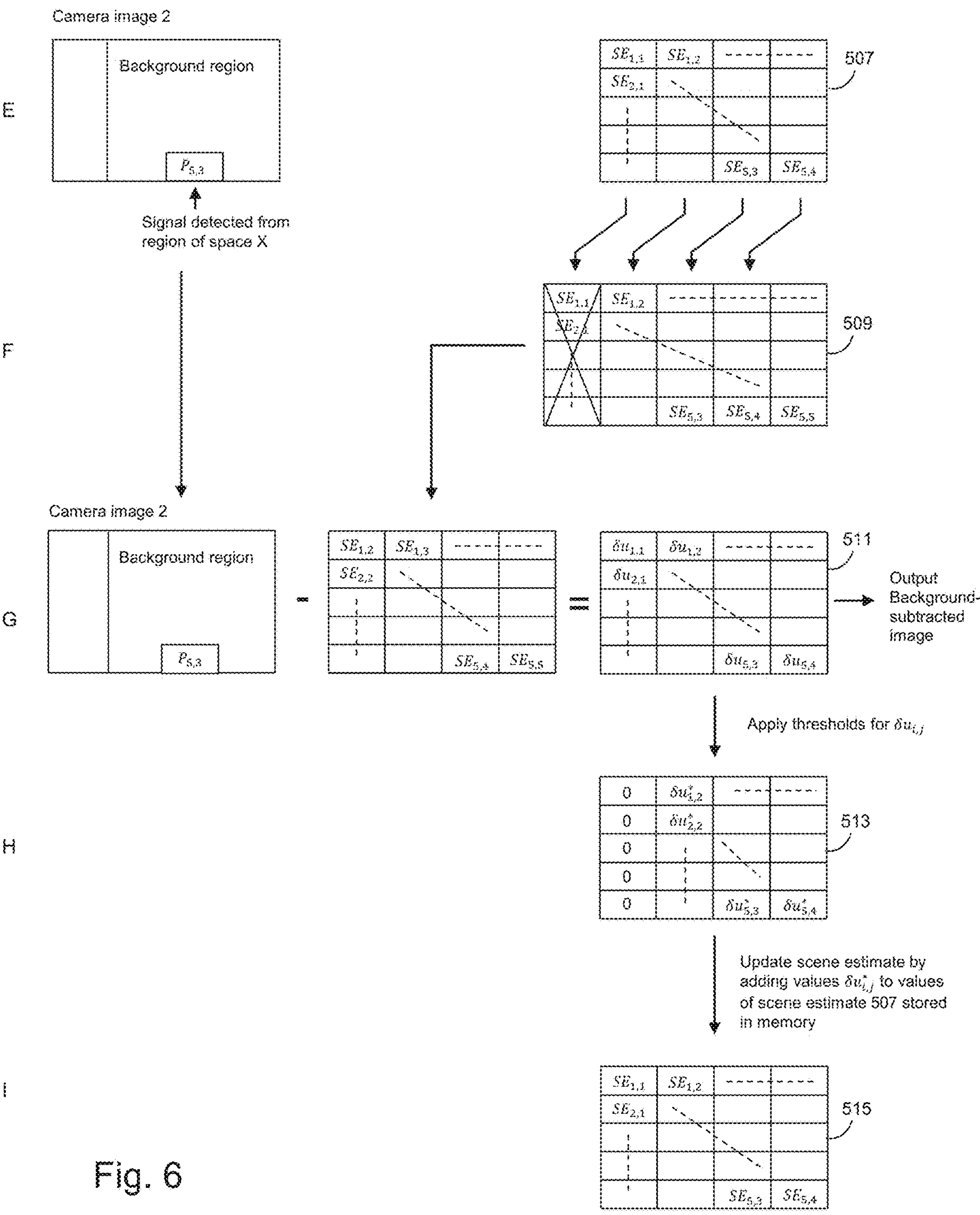
FIG. 6 shows an example of how a scene estimate is updated upon receiving a new input image from an image sensor, in a method according to an embodiment.
Figure 7:
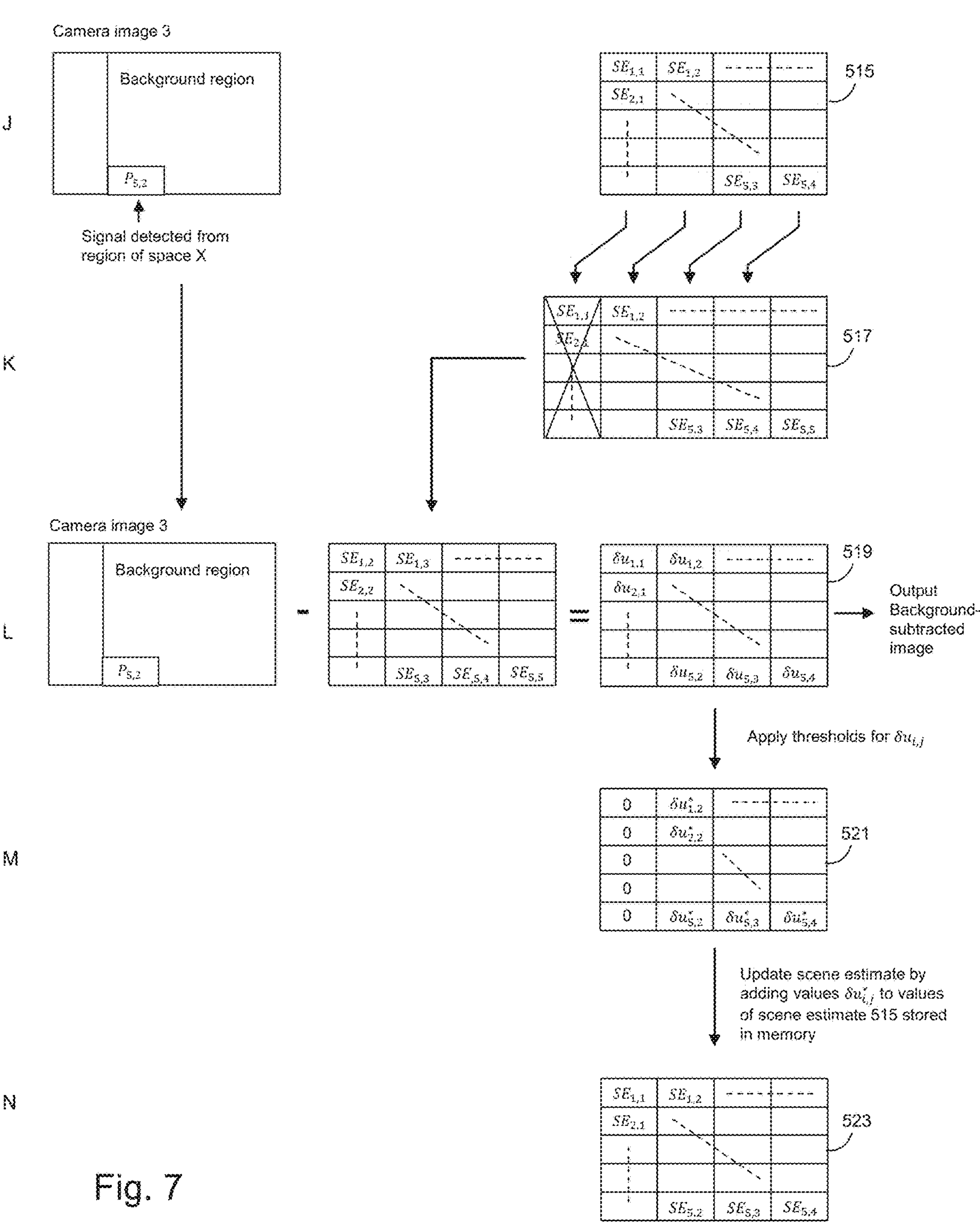
FIG. 7 shows an example of how a scene estimate is again updated upon receiving a new input image from an image sensor, in a method according to an embodiment.

The process of updating the scene estimate is shown in more detail in FIGS. 5 to 7. Referring to FIG. 5, the process begins in step A by initialising the scene estimate. The scene estimate comprises an array of values $SE_{i,j}$, each value indicating an estimate of the background signal associated with a respective image pixel $P_{i,j}$. In the present example, the array contains 5 rows and 4 columns, comprising a total of 20 values. It will be appreciated, however, that this is for purpose of explanation only, and in practice, the number of elements may be significantly greater to match the number of pixels contained in each input image.

To obtain an initial scene estimate 501, arbitrary values may be chosen for each element in the array. The values chosen may be located near the middle of the dynamic range of the image sensor; doing so can help reduce the number of iterations required to reach an accurate estimate of the background signal in subsequent images.

In step B, a first image is received from the image sensor. In this example, the region of interest comprises a column of pixels located at the left hand side of the image, with the background region comprising the remaining part of the image. The scene estimate is subtracted from the received image on a pixel-by-pixel basis to obtain the background-subtracted image 503, which is then forwarded to the normalizer.

As shown in FIG. 5, the background-subtracted image 503 comprises an array of residuals $\delta u_{i,j}$ where each value $\delta u_{i,j}$ reflects the difference between a pixel intensity in the image and the estimate of the background signal for that pixel as present in the scene estimate. Thus, for a region of space X that is imaged onto the pixel $P_{5,4}$, the residual for that region of space is calculated as $P_{5,4}-SE_{5,4}$ to obtain $\delta u_{5,4}$ in the background-subtracted image.

In step C, a thresholding process is carried out, whereby for each one of the residuals $\delta u_{i,j}$, it is determined whether or not the residual lies within a predefined range of values. If the residual $\delta u_{i,j}$ for a particular pixel is within the specified range, the value of that residual is retained. If the residual lies outside the specified range, then the residual is replaced by whichever end of the range the residual lies closest to. Each one of the residuals in the background-subtracted image is assessed in this manner to obtain a revised set of values $\delta u_{i,j}$* 505. In the present embodiment, for pixels that lie within the region of interest of the image, the residuals associated with those pixels (i.e. the values $\delta u_{i,1}$ located in the column j=1 of the background-subtracted image) are set to zero.

In step D, the scene estimate is updated by adding the revised values $\delta u_{i,j}$* to the original scene estimate as obtained in step A. It will be apparent from this that where a residual $\delta u_{i,j}$ was within the specified range in step C, and was retained as the value $\delta u_{i,j}$* during the thresholding process, the net result of adding the value $\delta u_{i,j}$* to the original scene estimate will be to return the same value as was present in the input image. For example, we can consider the case where the threshold for a particular residual is specified as $-2^{14} \leq \delta u \leq 2^{14}$ and the pixel in the input image has a value of 47387, with a corresponding value in the scene estimate of 32768. Subtracting the value of the scene estimate from the image value leaves a residual δu:

$$\delta u=47387-32768=14619.$$

Since $-2^{14} \leq 14619 \leq 2^{14}$, the revised residual value δu*=14619.

Adding the revised residual value 14619 to the value of the scene estimate (32768) then returns the original value of 47387.

In contrast, for a residual $\delta u_{i,j}$ that was outside the specified range, the value $\delta u_{i,j}$* output in the thresholding process of step C will be smaller in magnitude than the value $\delta u_{i,j}$. In this case, the addition of the revised value $\delta u_{i,j}$* to the original scene estimate will result in a value smaller than that which was present in the input image. For example, we can consider the case where a pixel in the input image has the same value of 47387, but the corresponding value in the scene estimate is 30324.

Subtracting the value of the scene estimate from the image value leaves a residual δu:

$$\delta u=47387-30324=17063.$$

Since $2^{14} \leq 17063$, the revised residual value (δu* is $2^{14}$=16384.

Adding the revised residual value 16384 to the value of the scene estimate (30324) then returns a value of 46708, which is smaller than the value 47387 in the input image.

Having updated the scene estimate in step D, the updated scene estimate 507 is now stored in memory, replacing the original scene estimate as obtained in step A.

FIG. 6 shows the continuation of the process on receipt of a second image from the image sensor. Here, the field of view has shifted a distance of one pixel to the right, meaning that the region of space X is now captured in a pixel $P_{5,3}$ that is located one pixel to the left of where it appeared in the previous image.

In step E, the scene estimate 507 as stored in memory in step D of FIG. 5 is retrieved from the memory, and in step F a process of alignment performed in order to match the estimated background signals in the scene estimate with the corresponding pixels of the image. In the present case, since the field of view has shifted one pixel to the right, the values in the scene estimate are each shifted one pixel to the left.

It will be appreciated that, as a result of the shift in field of view, the values $SE_{i,1}$ in the first column of the scene estimate are no longer relevant as they correspond to regions of space that have passed outside of the field of view. As part of the alignment procedure, these values are deleted and replaced by the values of the second column $SE_{i,2}$. At the same time, the shift to the left of the values in the scene estimate means that the column furthest to the right is now empty. To allow for this, the column is populated with arbitrary values $SE_{i,5}$, these values being chosen in the same way as when initialising the scene estimate in step A.

Referring back to FIG. 5, it can be seen that the estimate of the background signal for the region of space X corresponds to element $SE_{5,4}$ of the updated scene estimate 507, with the position of the element $SE_{5,4}$ in the array matching that of the image pixel $P_{5,4}$ in which the region of space X is located. Following the alignment procedure carried out in step F, the value of the element $SE_{5,4}$ (as updated in step D) is now shifted one place to the left and appears at position i=5,j=3 in the scene estimate. Accordingly, the value once more coincides with the image pixel $P_{5,3}$ in which the region of space X is located. More generally, if the aligned scene estimate 509 is overlaid with the image, the estimate of the background signal for each point in space will coincide with the location on the image sensor to which that region of space is being imaged. In this way, the estimate for the background signal associated with each point of space is carried forward from the previous image to the present image.

In step G, with the alignment complete, the scene estimate 509 is subtracted from the received camera image by the image subtractor to obtain a new background-subtracted image 511, which is then forwarded to the normalizer as before. The residuals $\delta u_{i,j}$ in the background-subtracted image 511 are then subjected to the same thresholding process as in step C, to obtain a revised set of values $\delta u_{i,j}$* 513 (step H). The revised set of values $\delta u_{i,j}$* are now added to the scene estimate 507 that was retrieved from memory at the start of the present iteration, and the resultant array of values stored in memory as an updated scene estimate 515 (step I).

FIG. 7 shows the continuation of the process on receipt of a third image from the image sensor. Here, the field of view has again shifted a distance of one pixel to the right, meaning that the region of space X is now captured in a pixel $P_{5,2}$ that is located one pixel to the left of where it appeared in the previous image.

In step J, the scene estimate 515 as stored in memory in step I of FIG. 6 is retrieved from the memory, and in step K, the same process of alignment is performed in order to match the estimated background signals in the scene estimate with the corresponding pixels of the image. As before, since the field of view has shifted one pixel to the right, the values in the scene estimate 515 retrieved from memory are each shifted one pixel to the left, with the values $SE_{i,1}$ in the first column of the scene estimate 515 being discarded, and the rightmost column of the array being populated with arbitrary values $SE_{i,5}$.

Referring back to FIG. 6, it can be seen that the estimate of the background signal for the region of space X corresponds to element $SE_{5,3}$ of the updated scene estimate 515, with the position of the element $SE_{5,3}$ in the array matching that of the image pixel $P_{5,3}$ in which the region of space X is located. Following the alignment procedure carried out in step K, the value of that element $SE_{5,3}$ (as updated in step I) is now shifted one place to the left and appears at position i=5,j=2 in the scene estimate. Accordingly, the value once more coincides with the image pixel $P_{5,2}$ in which the region of space X is located. More generally, if the aligned scene estimate 517 is overlaid with the image, the estimate of the background signal for each point in space will coincide with the location on the image sensor to which that region of space is being imaged. In this way, the estimate for the background signal associated with each point of space is carried forward from the previous image to the present image.

In step L, with the alignment complete, the scene estimate 517 is subtracted from the received camera image by the image subtractor to obtain a new background-subtracted image 519, which is then forwarded to the normalizer as before. The residuals $\delta u_{i,j}$ in the background-subtracted image 519 are then subjected to the same thresholding process as in steps C and H, to obtain a revised set of values $\delta u_{i,j}$* 521 (step M). The revised set of values $\delta u_{i,j}$* are now added to the scene estimate 515 that was retrieved from memory at the start of the present iteration, and the resultant array of values stored in memory as an updated scene estimate 523 (step N).

Figure 8:
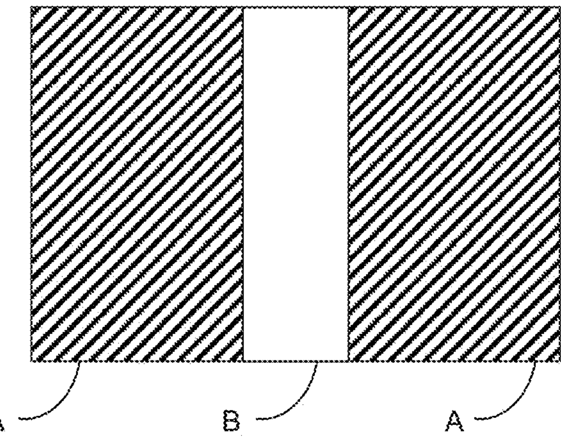
FIG. 8 shows examples of thresholds to be applied at different points across an image in a method according to an embodiment.

FIG. 8 shows how the thresholds applied when computing the values $\delta u_{i,j}$* from the residuals $\delta u_{i,j}$ may vary depending on the location on the image sensor. In particular, a different threshold may be applied to pixels that lie in the background region, compared to ones that lie in the region of interest in the image. In the example shown in FIG. 8, the region of interest comprises two or more adjacent columns of pixels at the centre of each image. For a pixel that lies in the background region A, the value $\delta u_{i,j}$* will remain the same as the residual $\delta u_{i,j}$ provided that $-2^{12} \le \delta u_{i,j} \le 2^{12}$. In the event that $\delta u_{i,j}$ lies outside that range, the revised value $\delta u_{i,j}$* for the pixel will be equal to whichever one of the bounds $-2^{12}$ or $2^{12}$ the residual value $\delta u_{i,j}$ lies closest to. Thus, a difference of 5000 between the intensity at a pixel in the image and the value of the scene estimate for that pixel will result in a revised value $\delta u_{i,j}$* of 4096 (i.e. $2^{12}$) for the pixel in question. In contrast, if the difference between the intensity of the pixel and the value of the scene estimate is 4000, the revised value $\delta u_{i,j}$* for that pixel will remain as 4000, since this value lies between the bounds of $-2^{12}$ and $2^{12}$.

For pixels that lie within the region of interest, the threshold may be set at 0, such that the values $\delta u_{i,j}$ are automatically set to 0 when updating the scene estimate.

Figure 10:
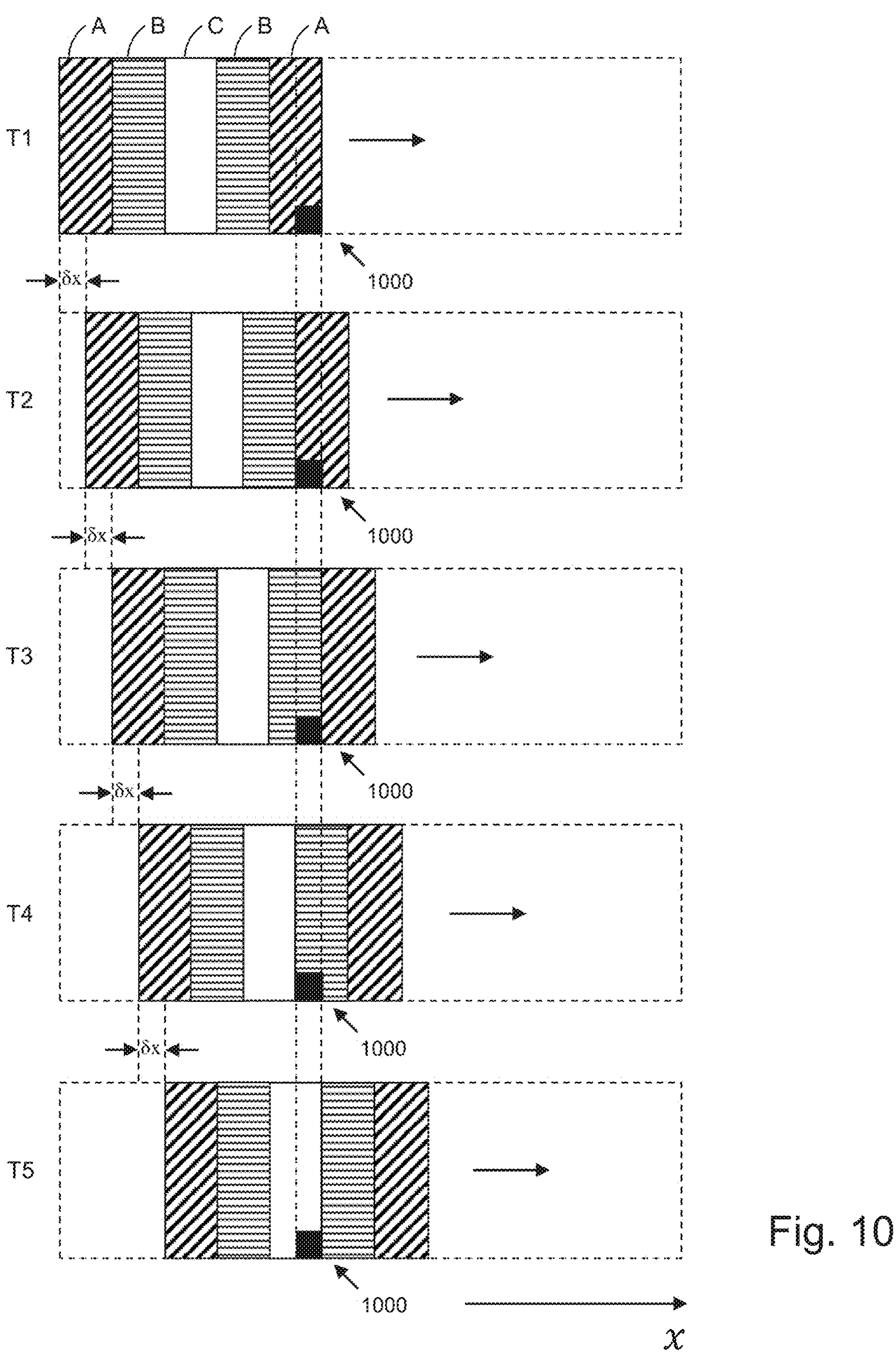
FIG. 10 shows a further example of how by shifting the field of view of an image sensor, the same region of space is imaged onto different points of the image sensor at different points in time.

In some embodiments, the estimate of the background signal can be further enhanced by employing different thresholds across the image sensor when processing the residuals in the background-subtracted image. FIG. 9 shows an example in which the background region is itself split into two regions A and B, whilst the region of interest in the centre of the image is denoted as C. As shown in the table of FIG. 9, the range of allowed values for $\delta u_{i,j}$ is smaller for region B than region A. Thus, for pixels located in region B, there is a greater chance that the residual $\delta u_{i,j}$ in the background-subtracted image will be capped at the limit of the specified range when determining the revised values $\delta u_{i,j}$*. The smaller range of allowed values in region B helps to prevent sudden large variations from the current estimate due to possible defective pixels or a single-frame abnormality in the background. FIG. 10 shows how this difference in thresholds will apply as a particular region of space 1000 is imaged onto different points of the image sensor at different points in time. Similar to FIG. 3, the region of space 1000 enters the field of view of the image sensor at T1, where it is imaged to a point located in region A of the background. The scene estimate is updated as before, with a determination being made as to whether the residual for the pixel in question lies within the range specified for region A of the sensor (in the present example, $-2^{14}$ to $-2^{14}$). At time T2, the region of space 1000 is imaged to a different pixel that lies closer to the centre of the image sensor, but still within the region A, hence the same threshold is used when determining the revised value $\delta u_{i,j}$* for the pixel in question. At time points T3 and T4, the region of space 1000 is now being imaged to respective points on the image sensor that lie within the region B. Thus, when updating the scene estimate at these two time points, a determination is made as to whether the residual for the respective pixel lies within the range specified for region B of the sensor (in the present example, $-2^{12}$ to $-2^{12}$). At time point T5, the region of space 1000 is being imaged to a pixel that lies within the region of interest, and hence the value $\delta u_{i,j}$* is automatically set to 0 for the pixel.

As a result of the steps shown in FIGS. 5 to 8, the estimate of the background signal for a particular region of space is continually updated as the region passes through the field of view of the image sensor. In more detail, the described embodiments can help to approximate the mean intensity (background signal) that would be observed from the particular region of space, in the event that the field of view were held stationary and averaged over a number of image frames. This can be understood as follows.

First, owing to the very high frame rate, it can be assumed that the background signal from a particular region of space is quasi-static between successive frames; this can be seen in the formula below, which analyses the temporal variance in intensity I from a particular region of space:

$$\lim_{\delta t \to 0} [I_1 - (I_1 + \delta I * \delta t)] = 0$$

where I=intensity of signal from the region of space and δt=sample time. As the sample time δt approaches 0, there is no perceptible variance in the intensity for any two consecutive frames. Where some subtle variance occurs, this is due to other factors which may be approximated by a Gaussian distribution with mean located at the true intensity. The prolonged presence of the region of space in the field of view—and the continued update of the estimated background signal from that region of space as it passes through the field of view—helps to neutralise the random error introduced by the Gaussian noise for a more accurate estimate. In contrast to other conventional approaches, the update to the estimated background signal is carried out on the fly as the field of view is moving, without the need to capture and store multiple images with the field of view being held stationary.

Figure 11:
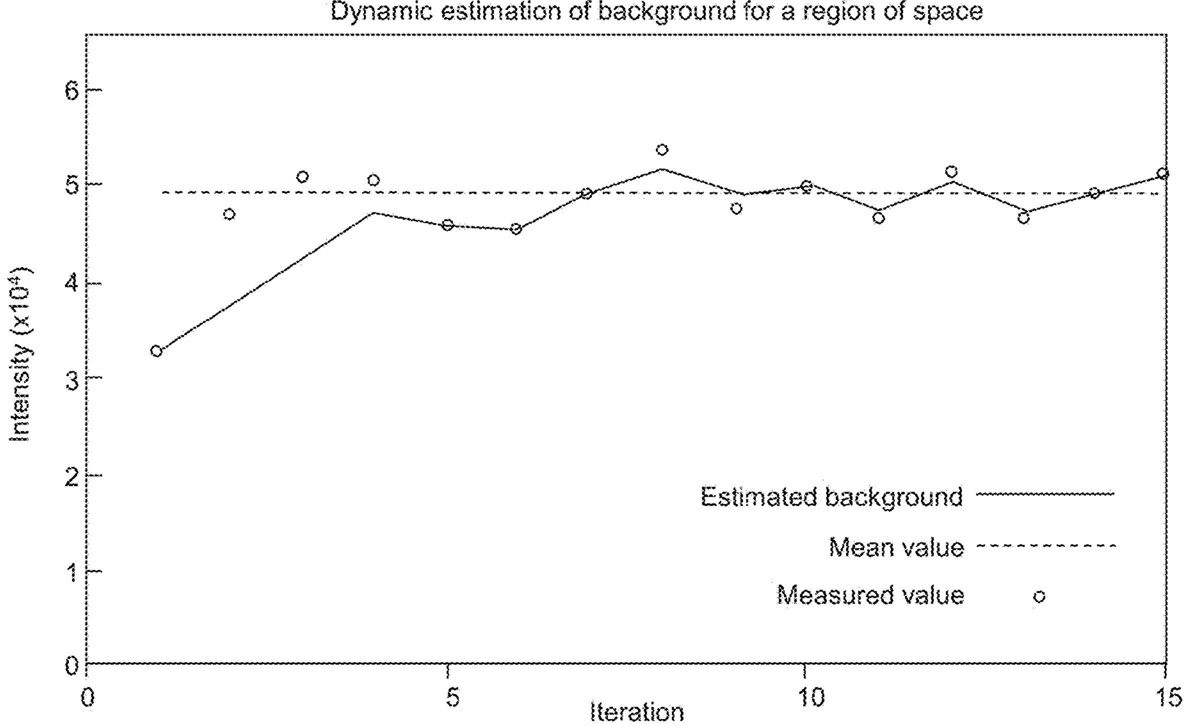
FIG. 11 shows an example of how the estimated background signal for a region of space is updated over time, as the region of space is imaged to different points on the image sensor.
Figure 12:
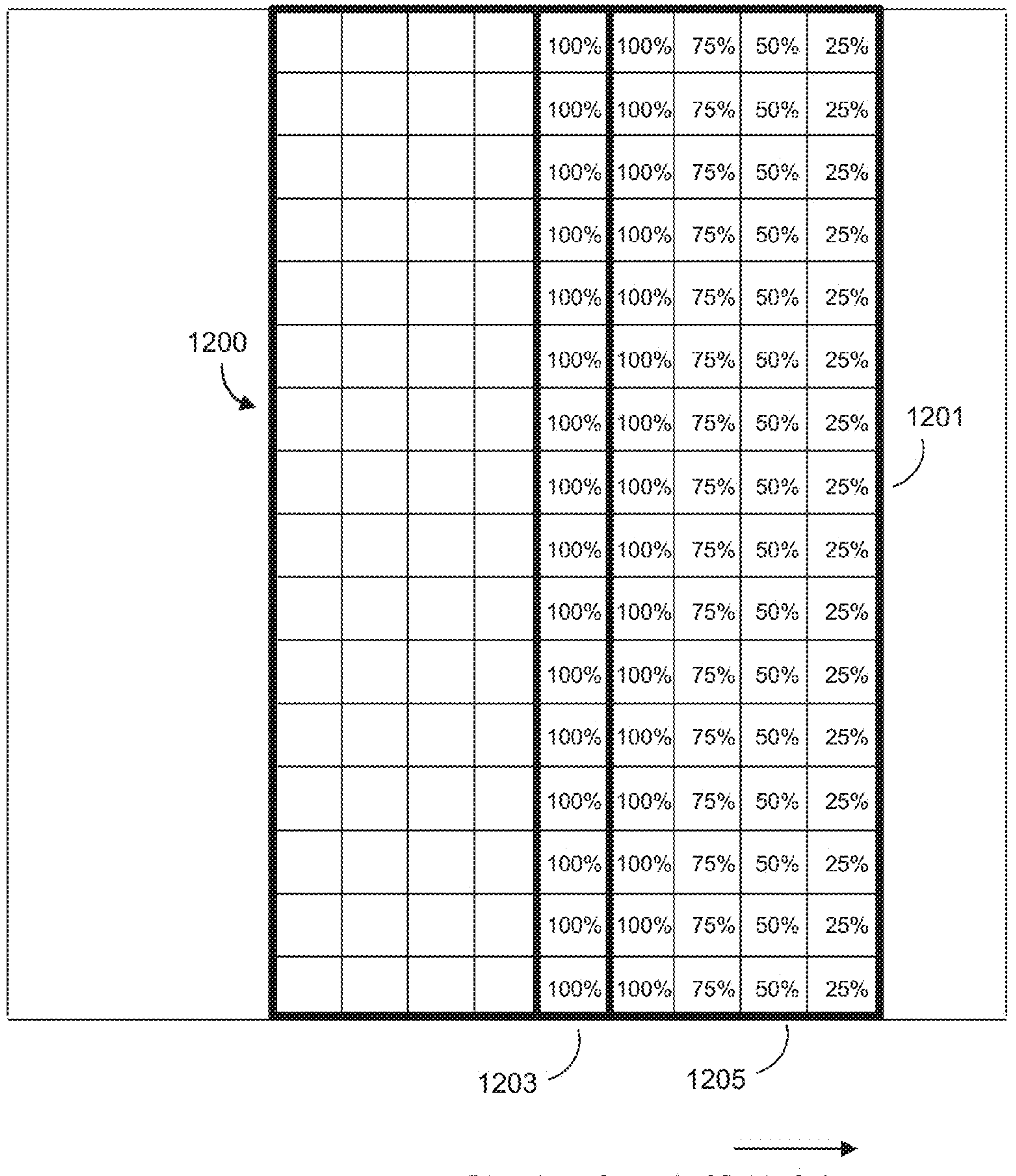
FIG. 12 shows an example of how the percentage accuracy in the estimate of the background signal might vary across an image, in a method according to an embodiment.

The above principle can be further understood with reference to FIGS. 11 and 12. FIG. 11 shows how the estimate of the background signal from a region of space varies over the course of 15 iterations. Each iteration marks the receipt of a new image and the accompanying update in the scene estimate, in the period between when the region of space first enters the field of view and when it reaches the region of interest in the $16^{th}$ image frame. As can be seen, over the course of the 15 iterations, the estimate of the background trends towards the mean signal that would be measured if the field of view were held stationary and averaged over multiple frames. The estimate of the background signal in the $15^{th}$ iteration marks the background signal that will be subtracted from the region of interest upon receipt of the $16^{th}$ image.

FIG. 12 shows how the percentage accuracy in the estimate of the background varies across the image 1200 (note, for simplicity, in this case, the image is depicted as having four columns of pixels between the leading edge 1201 of the field of view and the central column 1203 that comprises the region of interest in the image). The four columns of pixels 1205 between the leading edge 1201 and the central column 1203 comprise the background region of the image. As can be seen, the accuracy of the estimate in the background signal is lowest at the leading edge 1201, as the regions of space captured in this portion of the image have only just entered the field of view for the first time. As one moves away from the leading edge 1201 towards the central column 1203, the percentage accuracy increases; this reflects the fact that the regions of space imaged to those pixels were also present in the preceding frame(s) and the estimate of the background signal in those regions is based not only on the current image frame, but also on the signal measured in those earlier frames. Within the central region of interest, the percentage accuracy is close to 100%, meaning that the estimated background is equivalent to that which would be recorded as the mean background signal if averaging over a number of frames with the field of view held stationary at this point.

It will be appreciated that the percentages displayed in FIG. 12 are provided for purpose of explanation only, rather than necessarily being representative of actual (real) estimates. Indeed, a percentage accuracy of 100% may be achieved in pixels some time before those pixels enter or approach the region of interest. For example, referring back to FIG. 11, the estimate can be seen to converge on the true mean intensity after 7 or 8 iterations, approximately half of the 15 iterations available before the pixel in question enters the region of interest.

Accordingly, when the background signal is subtracted from the measured intensity in the region of interest—as will happen when the latest scene estimate is subtracted from that particular image—the signal to background ratio for the region of interest in the background-subtracted image will be significantly enhanced. As images continue to be received and processed, the image processor will generate a temporal stream of background-subtracted images. Each background-subtracted image will be forwarded to the normaliser and then output by the image processor as part of a continuous stream of images having an enhanced signal to background ratio in the region of interest.

The normaliser itself ensures that the full dynamic range of the image processor is utilised, in order to maximise contrast in preparation of subsequent image processing algorithms that benefit from high contrast in the output image. The subtraction of the scene estimate from the input image will generate a background-subtracted image with any objects contained within the region of interest being brightly lit, but with a lower intensity than the original image. The remaining parts of the background-subtracted image will be zero or close thereto, assuming that the background signal has been accurately estimated. Some image processing algorithms, however, may not benefit from the simple background subtraction performed by the image subtractor, as they may rely on the difference between neighbouring pixels intensities. To allow such algorithms to benefit from the image subtraction, the intensity of each pixel in the background-subtracted image may be remapped by the normaliser to cover the full dynamic range available. While the background-subtracted image is streamed through the normaliser, an iterative process to identify the maximum pixel value in the background-subtracted image. The inverse of the maximum value is calculated and based on the data range, an appropriate factor is determined to maximise the data range usage. The background-subtracted image is then scaled by the appropriate factor.

Figure 13:
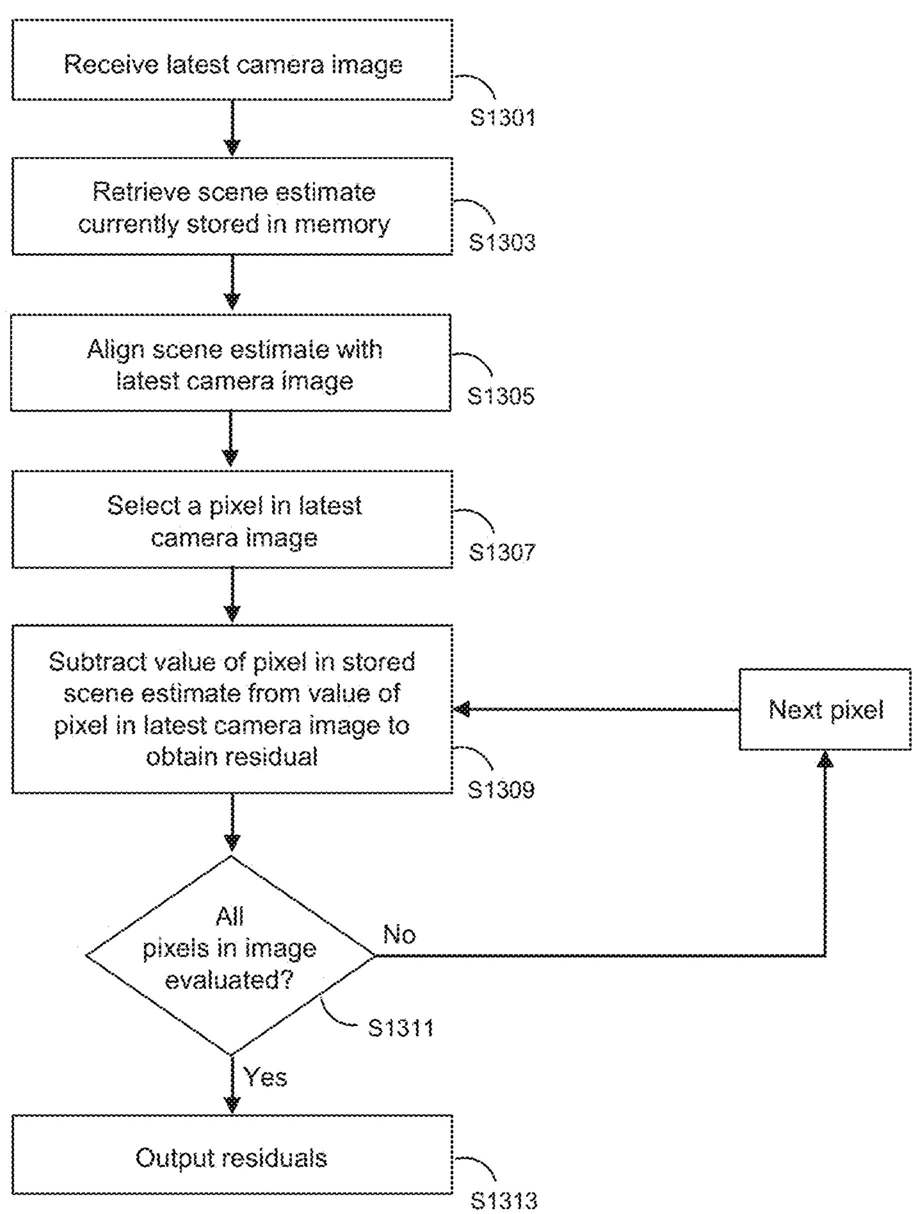
FIG. 13 shows a flow-chart of steps carried out by an image subtractor in a method according to an embodiment.
Figure 14:
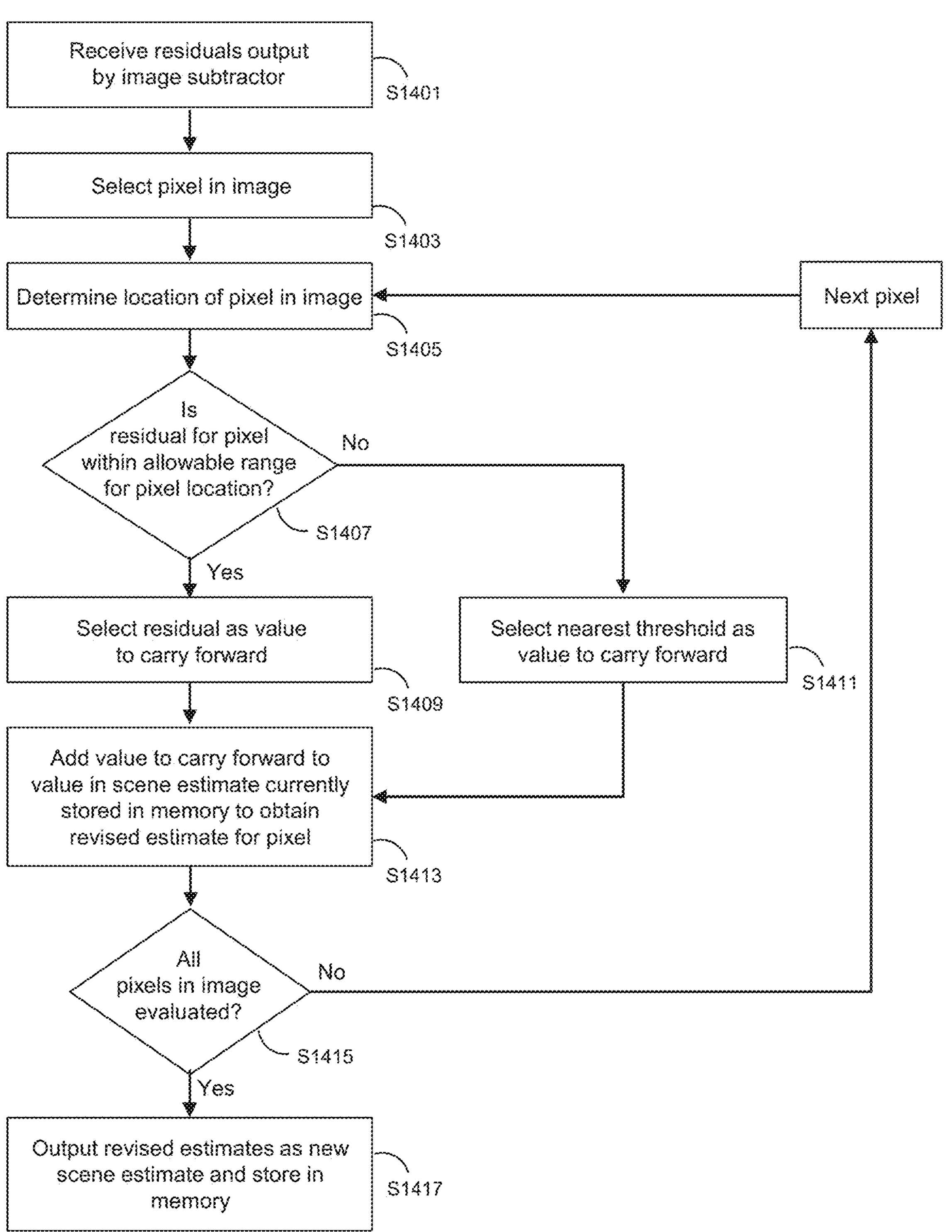
FIG. 14 shows a flow-chart of steps carried out by a scene estimator in a method according to an embodiment.

The steps carried out by the image subtractor 401 and scene estimator 403 of FIG. 4 are further summarised in FIGS. 13 and 14. FIG. 13 shows the sequence of steps as performed by the image subtractor 401 on receipt of a new image. In step S1301, the image is received, and in step S1303, the latest scene estimate is retrieved from memory. In step S1305, the scene estimate is aligned with the received camera image. In step S1307, a pixel in the camera image is selected and the estimate of the background signal for the pixel as stored in the now aligned scene estimate is subtracted from the measured intensity in the pixel (step S1309) The process is repeated for each one of the pixels in the image, until all pixels have been evaluated (step S1311). It will be appreciated, that whilst FIG. 13 depicts each individual pixel as being processed in sequence, this is for purpose of explanation only, and in practice, embodiments may process each pixel in the image in parallel. Having subtracted the values in the scene estimate from the image, the residuals are output as the background-subtracted image (step S1313).

FIG. 14 shows the steps carried out by the scene estimator upon receipt of the residuals from the image subtractor. In step S1401, the scene estimator receives the residuals. In step S1403, a pixel in the image is selected, and its location within the image is determined (step S1405). Next, in step S1407, a determination is made as to whether the value of the residual is within the allowable range for that location. In the event that the value is within the allowable range, the value of the residual is carried forward (step S1409). In the event that the value of the residual lies outside the allowable range, a determination is made as to which boundary of the specified range the value lies closest to, and the value of that boundary is selected as the value to carry forward (step S1411). In step S1413, the value selected to carry forward is added to the scene estimate as retrieved from the memory in step S1303. The process is repeated for each one of the pixels in the image, until all pixels have been evaluated (step S1415). (As above, it will be appreciated, that whilst FIG. 14 depicts each individual pixel as being processed in sequence, this is for purpose of explanation only, and in practice, embodiments may process each pixel in the image in parallel). Having computed the revised value for each element in the scene estimate, the updated scene estimate is stored in memory, to be retrieved upon receipt of the next image from the image sensor (step S1417).

Figure 15:
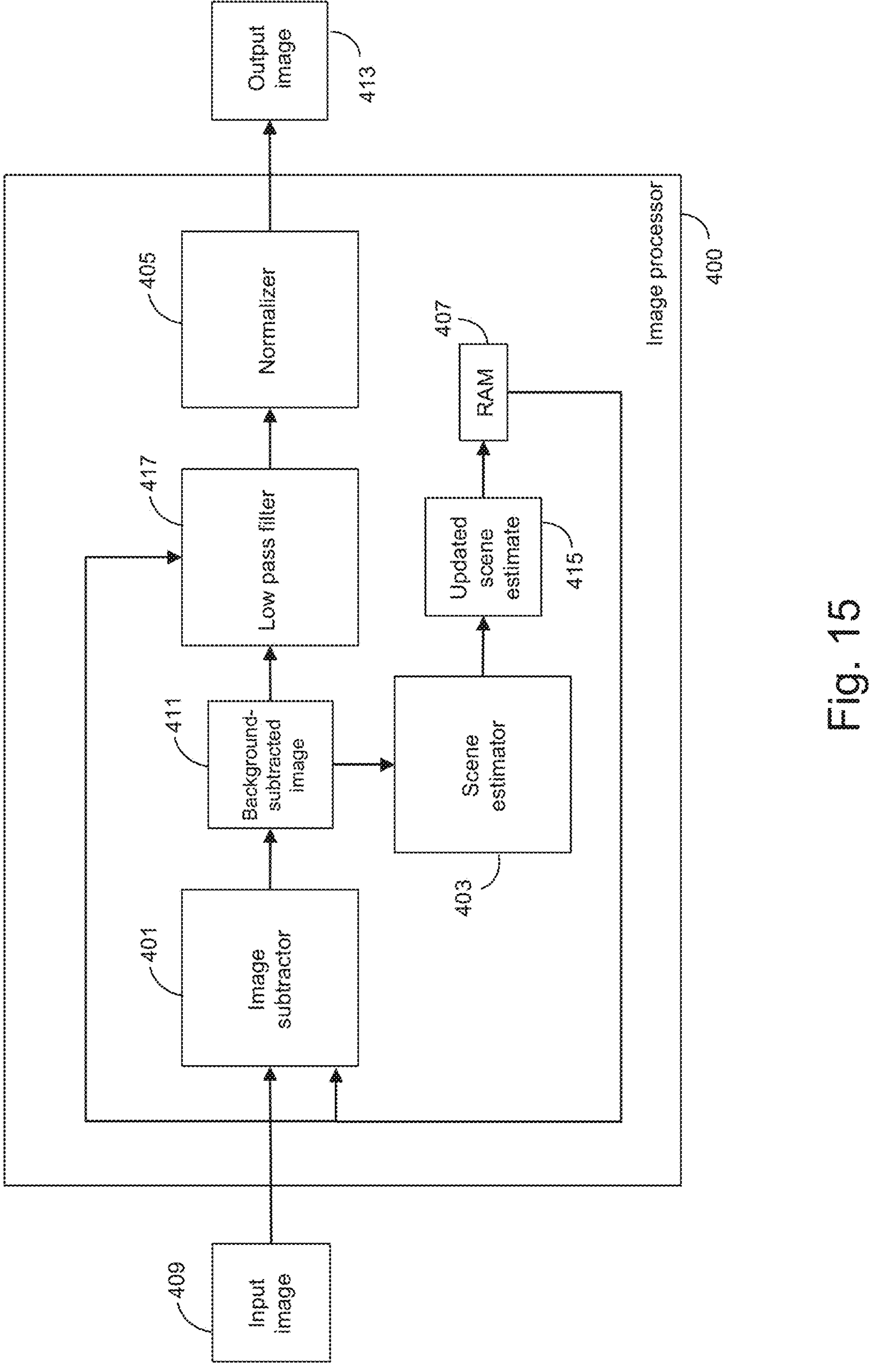
FIG. 15 shows a schematic of an image processor according to an embodiment.

A further embodiment of the image processor will now be described with reference to FIGS. 15 to 17. Referring to FIG. 15, the image processor of the present embodiment has similar components to that shown in FIG. 4, with components that are common to both embodiments being labelled with the same reference numerals. In addition to the components shown in FIG. 4, the image processor of the present embodiment includes a Low Pass Filter (LPF) 417 that is arranged between the image subtractor and the normalizer.

By subtracting the scene estimate from the input image, the image subtractor 401 is able to remove the background signal from the image quite effectively; however, some random noise may still remain after the scene estimate has been subtracted. The noise may manifest itself as residual values in pixels where no signal should be present. The presence of these residual values means that the output image may not be suitable for certain operations such as blob detection, where even a minor intensity generated by a single pixel may generate sufficient contrast to become a false detection. It is desirable, therefore, to remove such noise in its entirety. The LPF 417 acts to remove the noise accordingly.

Figure 16:
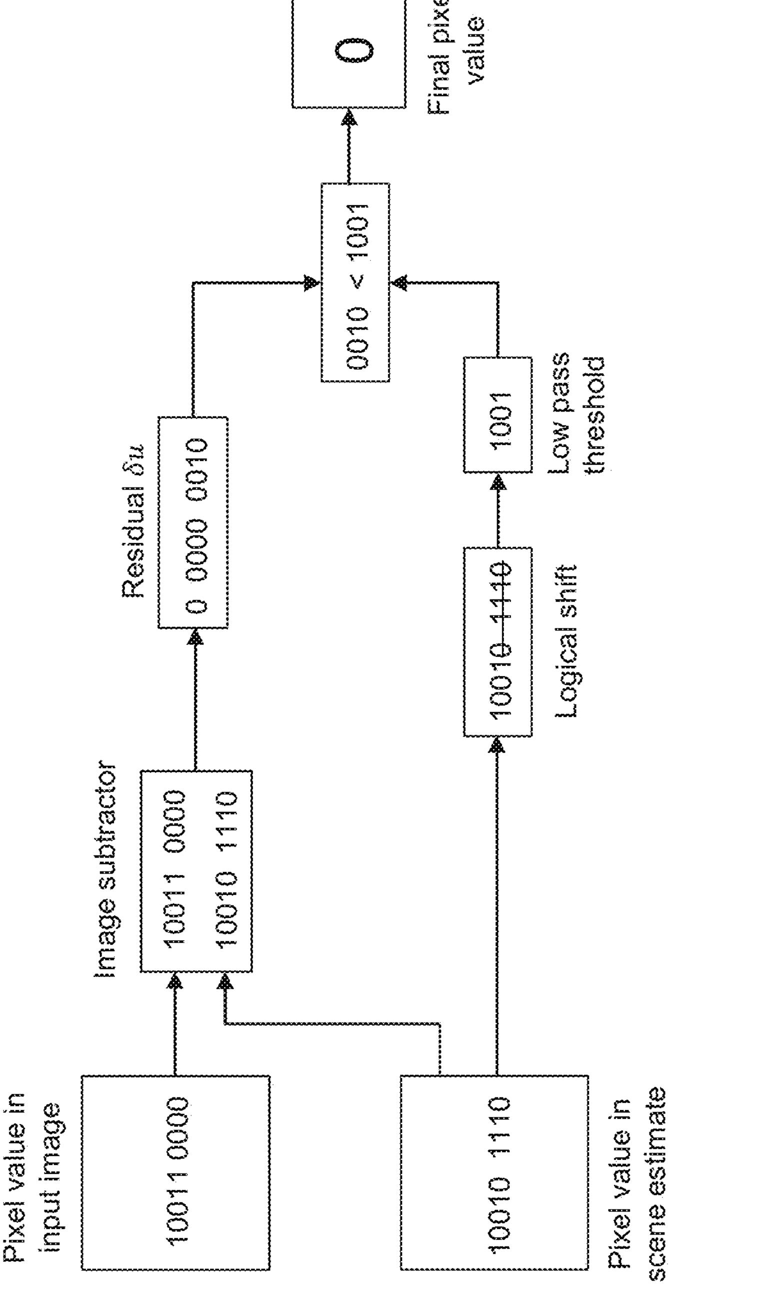
FIG. 16 shows a sequence of steps carried out when applying a low pass filter to an image in a method according to an embodiment.

FIG. 16 shows an example of how the LPF 417 is implemented. A pixel in the background-subtracted image is deemed to contain a meaningful residual if the residual is greater than a threshold set by the low pass filter. The threshold itself is based on a logical right bit shift on the estimate of the background value for the pixel location, as contained in the scene estimate retrieved from memory on receipt of the current image.

In the example shown in FIG. 16, the pixel value in the input image is 304, which is reflected in the binary sequence 10011 0000. The value for the same pixel in the scene estimate as retrieved from memory is 302, which is reflected by the binary sequence 10010 1110. The image subtractor subtracts the value of the scene estimate from the pixel value in the image to obtain the residual δu of 2, reflected by the binary sequence 0 0000 0010.

In order to obtain the low pass threshold for the pixel, a logical shift of 5 is applied to the value of the scene estimate:

1001→1001

The binary sequence 1001 then gives the threshold value of 9 for the pixel in question.

Since the residual $\delta u<9$, the pixel value in the output image is set to 0.

A logical shift of 5 generates a threshold which equates to approximately 3-6% of the value contained in the scene estimate. This avoids the need for a global low pass filter, which would not be as effective in scenarios where there are significant variances in intensity within a single frame or across multiple frames. This implementation also allows for background noise up to 3-6% not to constitute any issue to the actual output; other bit shift values could be used as necessary.

Figure 17:
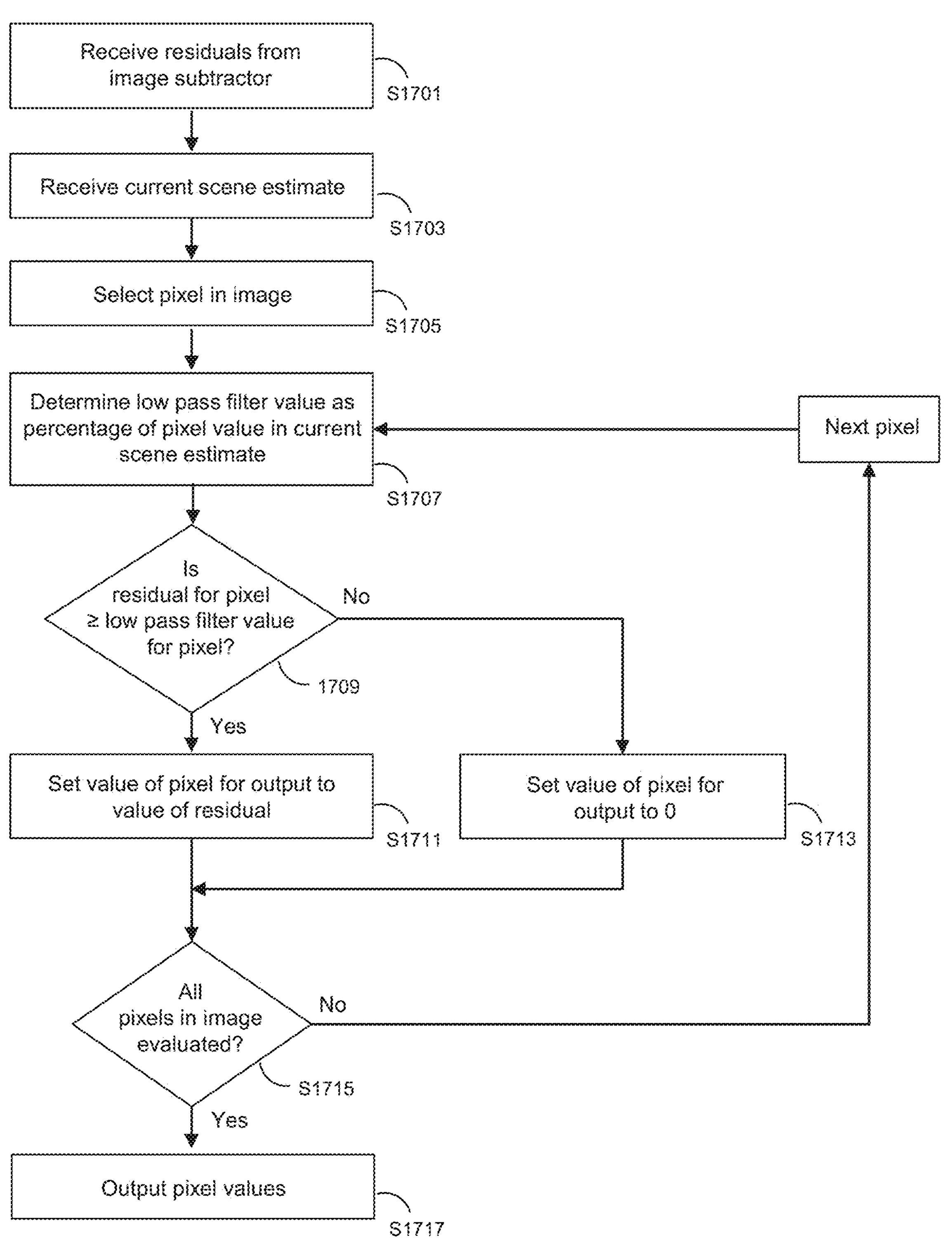
FIG. 17 shows a flow-chart of steps carried out by a low pass filter in a method according to an embodiment.

FIG. 17 summarises the steps carried out by the low pass filter. In step S1701, the low pass filter receives the residuals δu in the background-subtracted image. In step S1703, the low pass filter receives the value contained in the scene estimate as retrieved from memory in the current iteration. In step S1705, the low pass filter selects a pixel in the image, and determines the low pass threshold for that pixel as a percentage of the value of the scene estimate for that pixel (step S1707). In some embodiments, as described above, the low pass threshold is obtained by applying a logic shift to the binary value of the scene estimate for that pixel. In step S1709, a determination is made as to whether the residual δu for that pixel is greater than the low pass threshold. If so, the value of the residual δu is retained (step S1711); otherwise, the value of the residual in the background-subtracted image is set to 0 (step S1713). Once all pixels have been evaluated (step S1715), the pixel values are output to the normaliser (step S1717).

Figure 18:
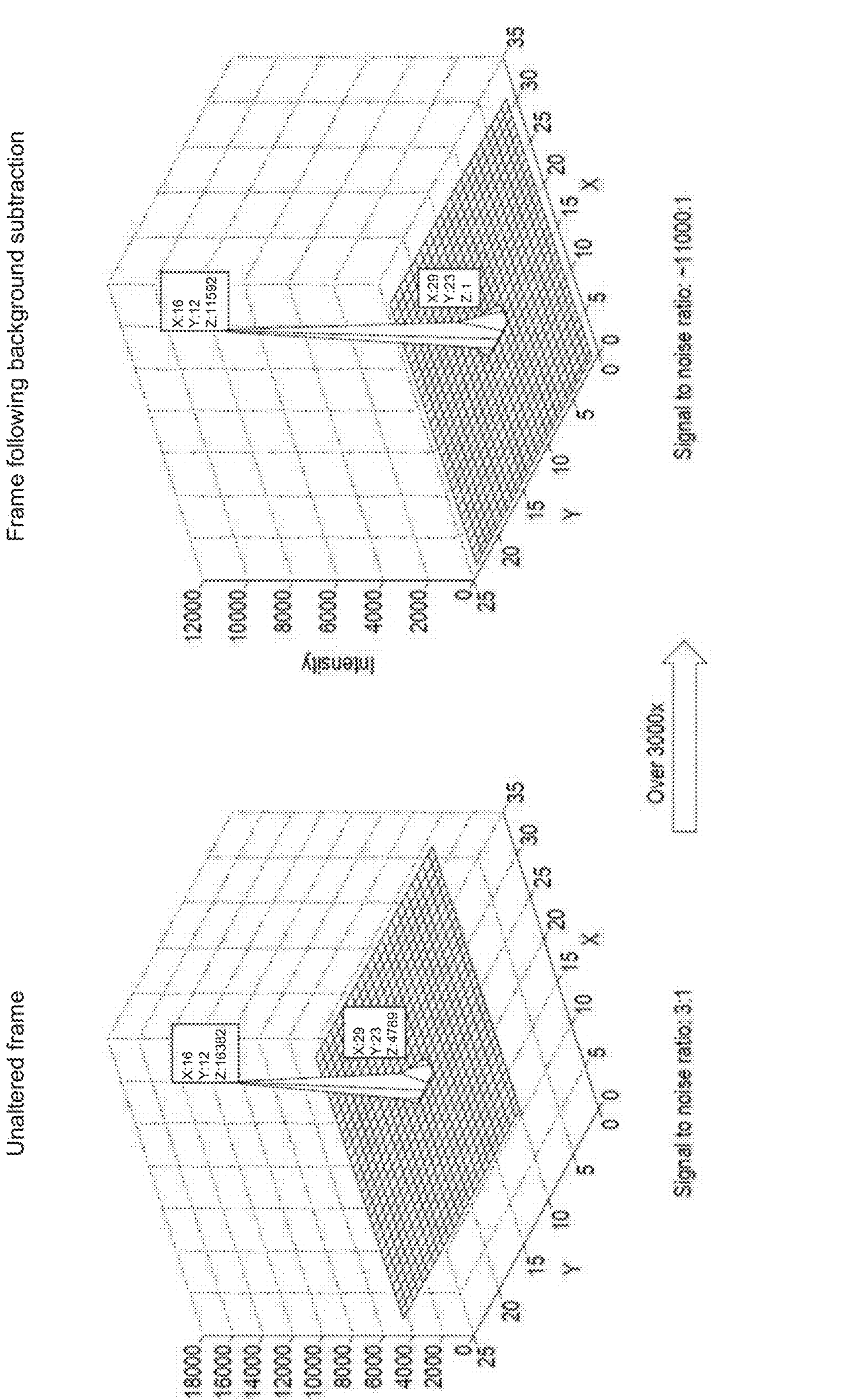
FIG. 18 shows an example of how the signal-to-noise ratio in an output image can be enhanced through use of a method according to an embodiment.

FIG. 18 shows the improvement in the signal to background ratio in the region of interest in an image processed according to an embodiment, as compared to an unaltered image. Referring first to the unaltered image, it can be seen that the peak intensity in the image, at the coordinate (16, 12) is 16382, whilst the background signal at coordinate (29, 23) is 4789, providing a signal to noise ratio of approximately 3.4. Referring now to the processed image, the peak intensity at the coordinate (16, 12) is 11592, whilst the background signal at coordinate (29, 23) is reduced to 1, effectively providing a signal to noise ratio of 11,500, more than 3000 times that of the unaltered image.

Figure 19:
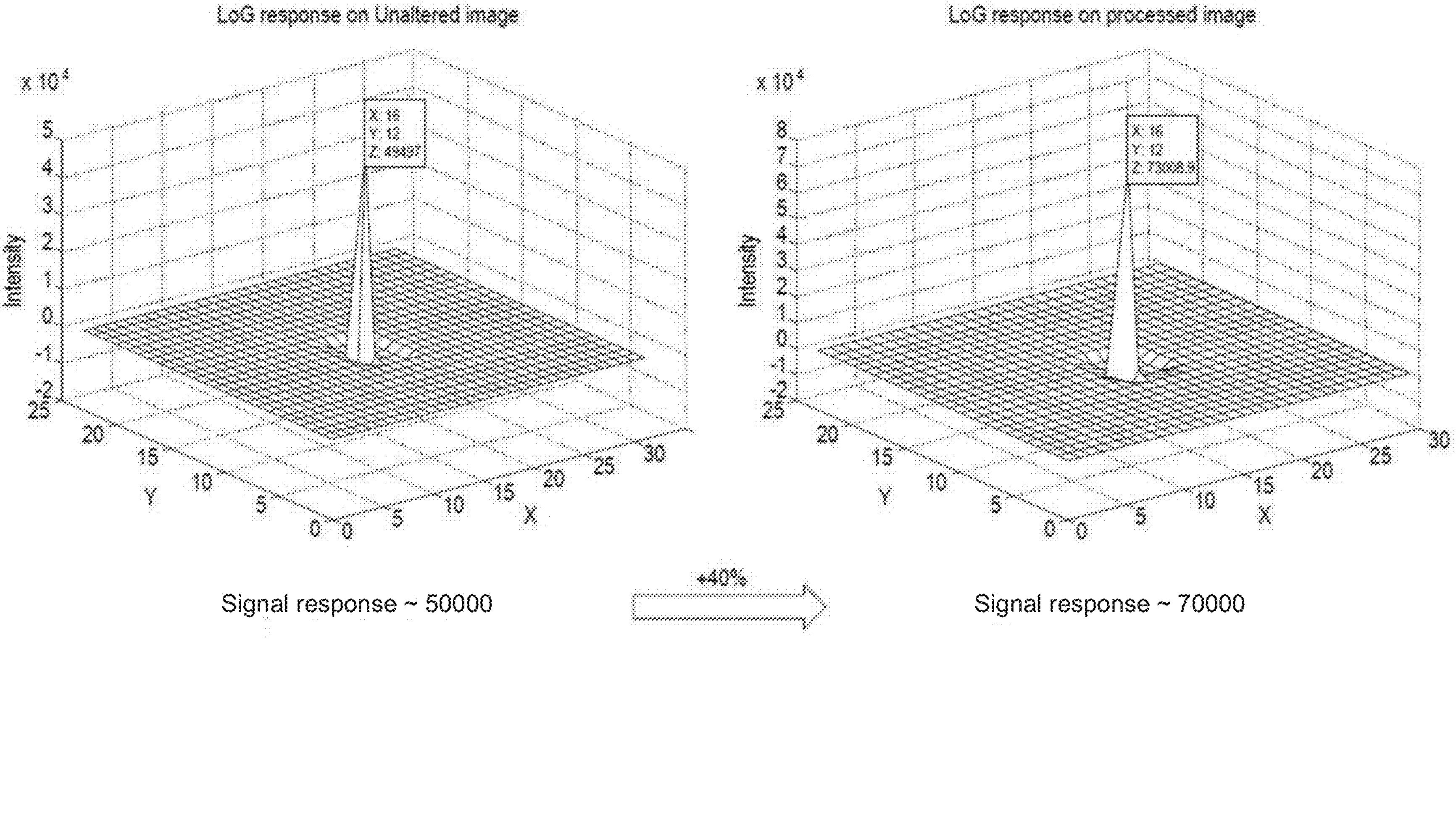
FIG. 19 shows a further example of how the signal-to-noise ratio in an output image can be enhanced through use of a method according to an embodiment.

FIG. 19 shows a comparison between the response obtained when the unaltered image frame of 18 is processed using a Laplacian of Gaussian (LoG) algorithm, and the response obtained when the processed image of FIG. 18 is processed using the same algorithm. The effect of pre-processing the image according to the embodiments described herein is to obtain a 40% improvement in the signal response in the final image.

Figure 20:
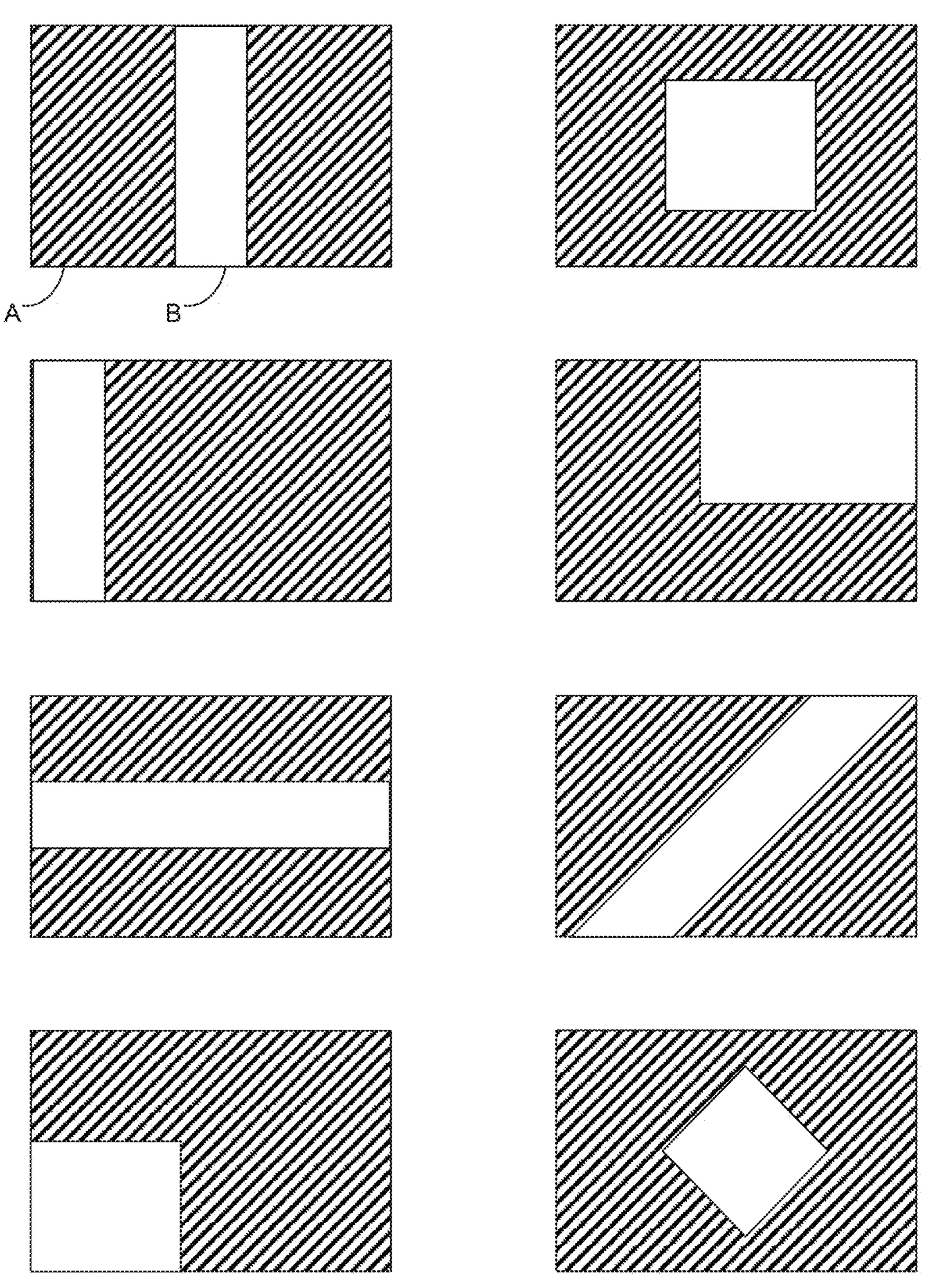
FIG. 20 shows example arrangements of a region of interest and background region within a field of view of an image sensor.

It will be appreciated that whilst the embodiments described above show the region of interest as comprising one or more columns of pixels, this is by way of example only, and the region of interest may take one of a number of different shapes within the field of view of the image sensor. FIG. 20 shows a number of alternative configurations in which the region of interest and background region(s) are shaped and/or positioned differently within the field of view. It will be understood that other arrangements are also possible.

Figure 21:
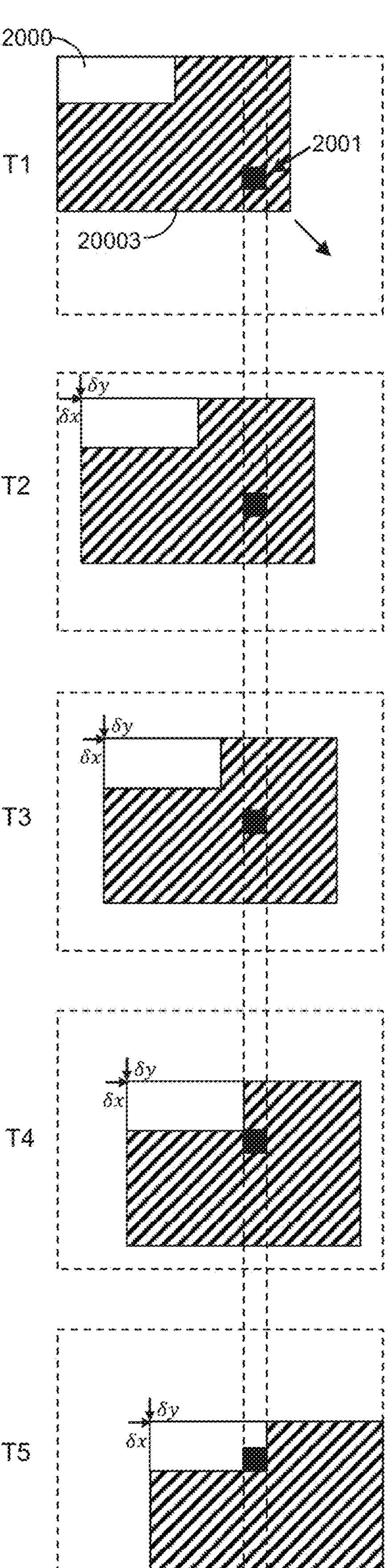
FIG. 21 shows a further example of how by shifting the field of view of an image sensor, the same region of space is imaged onto different points of the image sensor at different points in time.

Indeed, any arrangement may be used, provided that the background signal from a region of space entering the field of view can be adequately estimated before that region of space reaches the region of interest. In practice, this means ensuring that the region of interest and the background region are positioned to take into account the direction in which the field of view is moving, such that a region of space entering the field of view will first pass through the background region (ideally, for several iterations) before arriving within the region of interest. As an example, FIG. 21 shows a series of image captured at different time points, similar to those shown in FIGS. 3 and 10. Here, the region of interest 2000 comprises a rectangular portion in the upper left hand corner of the field of view. In this example, the field of view is shifted downwards by a distance δy and to the right by a distance δx at each step in time, meaning that a region of space 2001 that first appears towards the bottom right hand corner of the field of view will move in a diagonal trajectory through the background region 2003 and towards the region of interest. In this instance, both the right-most edge of the field of view and the bottom edge comprise the leading edge of the field of view. Since the field of view is displaced in both the x and y directions between images, the scene estimate is aligned with the input at each time step by applying both a row and column shift to the values in the array.

Figure 22:
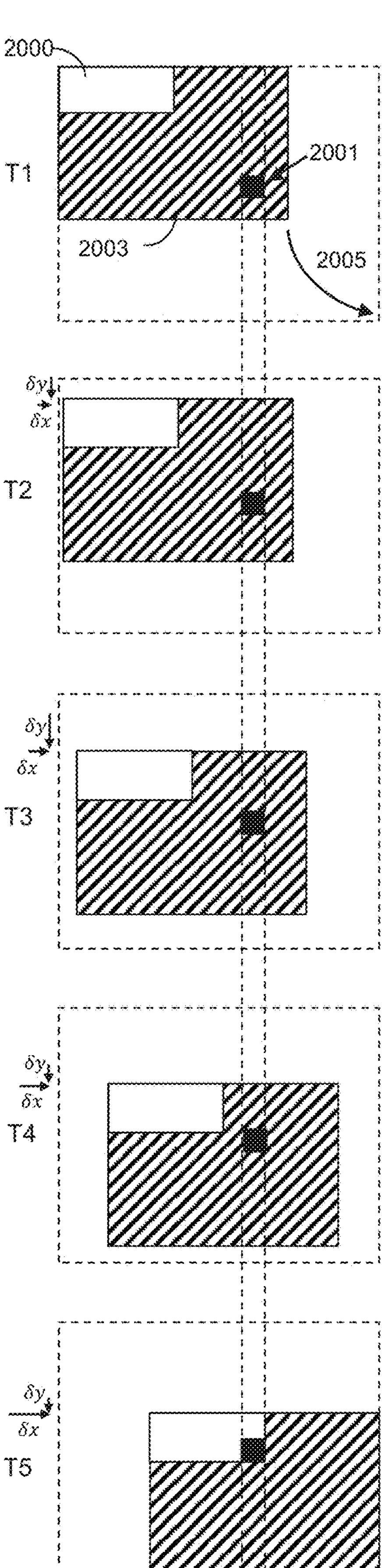
FIG. 22 shows a further example of how by shifting the field of view of an image sensor, the same region of space is imaged onto different points of the image sensor at different points in time.

Provided that the displacement of the field of view between input images is known, the scene estimate can be aligned and updated as in the previous described embodiments, allowing for the precise layout of the region of interest and background regions to be modified to suit different circumstances. As a further example, FIG. 22 shows a scenario similar to that of FIG. 21, but in which the field of move does not move in a linear path, but instead defines a curved path 2005 as it moves through space. Consequently, the displacement δy and δx that the field of view undergoes in the y and x directions, respectively, will vary between frames. However, provided the path of the field of view is known, and the displacement between frames can be determined, it is still possible to identify which pixel(s) in a given image correspond to a region of space imaged in a previous one of the images, and to subtract the background accordingly.

It will further be appreciated that sub-pixel displacements between successive images are possible; for example, if the frame rate of the camera is particularly fast, a region of space that is imaged onto a particular pixel in a first image may continue to be (partially) captured in that pixel in the subsequent image, as well as being captured in a neighbouring pixel. In this instance, an interpolation between the neighbouring pixels may be made to determine the scene estimate.

In the embodiments described above, it is assumed that the intensity of the signal as measured in the region of interest will be higher than that measured in the background region; this is owing to the region of interest including the same background as measured in the background region, whilst also including an additional intensity level due to its being illuminated or being subject to less attenuation by a neutral density filter, for example. If the background signal is taken to be X, and the signal from an object in the region of interest is taken to be Y, then the signal measured in the region of interest will be (X+Y). Performing the background subtraction then yields (X+Y)−X=Y for an object in the region of interest. Where no such object is present, the background subtraction will yield X−X=0. In some embodiments, by contrast, the intensity of the signal as measured within the region of interest may be lower than in the background region. For example, with reference to FIG. 2, the neutral density (ND) filter may be reversed so as to attenuate the signal received in the region of interest to a greater extent than the background region. In such instances, the signal from an object in the region of interest will be X, whilst the signal measured in the background region will be X+Y. Following the background subtraction from the region of interest, the recovered signal for an object in the region of interest will be: X−(X+Y)=−Y. Where no such object is present, the signal will be (X+(X+Y)=0. Thus, the signal Y can still be recovered by simply multiplying the outcome of the background subtraction by −1 (in the case where the low pass filter is implemented, the multiplication by −1 may be carried out prior to applying the low pass filter).

In general, embodiments described herein may be applied in any scenario where video processing of overlapping frames is used. Embodiments allow for real-time background subtraction of high frame rate video footage 'on the fly', without requiring large amounts of data processing or storage.

In particular, embodiments allow for:

- Reduced latency between the acquirement of the frame and the output of the results.
- Reduced utilisation of RAM for storing multiple frames.
- Reduced used of overall resources which can now be diverted to other processes.
- Improved results from subsequent image processing algorithms due to the improved contrast in the images.
- Minimal use of firmware resources and low latency from acquisition of the frame to outputting of an accurately background subtracted frame, which is crucial for real time target detection.

Embodiments may implemented on a Simulink® platform for video pipelines with a high consideration to be suitable on a FPGA.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method comprising:

receiving a first image captured on an image sensor, the image sensor comprising an array of pixels, obtaining a scene estimate for the first image, wherein the scene estimate comprises an array of values, each value comprising an estimate of a background signal for a region of space being imaged onto a respective one of the pixels of the image sensor;

storing the scene estimate in memory;

receiving a plurality of successive images, wherein for each one of the successive images, a field of view is shifted with respect to a preceding image and overlaps partially with that of the preceding image, for each one of the successive images:

retrieving the scene estimate from memory;

subtracting the scene estimate from the image to obtain a background-subtracted image for output;

updating the scene estimate based on the signal detected at a location on the image sensor to which the region of space is being imaged;

wherein updating the scene estimate comprises:

determining a value of the background-subtracted image for the location on the image sensor to which the region of space is being imaged;

if a magnitude of the value of the background-subtracted image is below a pre-defined threshold value, updating the scene estimate based on the value of the background-subtracted image; and if the magnitude of the value of the background-subtracted image is equal to or above the pre-defined threshold value, updating the scene estimate based on the threshold value;

wherein the pre-defined threshold value varies depending on the location on the image sensor to which the region of space is being imaged; and replacing the scene estimate stored in memory with the updated scene estimate.

2. A method according to claim 1, comprising:

prior to subtracting the scene estimate from the image to obtain the background-subtracted image:

determining a location on the image sensor to which the region of space is being imaged by determining a shift in the field of view of the image sensor to have taken place since the scene estimate was last updated; and applying a corresponding shift to the scene estimate, such that when the scene estimate is overlaid with the image, the estimate of the background signal for each point in space coincides with the location on the image sensor to which the respective point in space is being imaged.

3. A method according to claim 1, wherein the background-subtracted image comprises an array of values, each value indicating a difference between an intensity value of a pixel in the image and the estimated background signal for that pixel.

4. A method according to claim 1, wherein:

updating the scene estimate based on the value of the background-subtracted image comprises adding the value of the background estimate to the scene estimate; and updating the scene estimate based on the threshold value comprises adding the value of the threshold to the scene estimate.

5. A method according to claim 1, wherein the image sensor comprises a first set of pixels classified as a region of interest and a second set of pixels classified as a background region, wherein the pre-defined threshold is lower for pixels in the first set of pixels than for pixels in the second set of pixels.

6. A method according to claim 5, wherein the pre-defined threshold is zero for pixels in the region of interest.

7. A method according to claim 5, wherein for each received image, a portion of the field of view is more intensely illuminated than the rest of the field of view, wherein the region of interest corresponds to the portion of the field of view that is more intensely illuminated.

8. A method according to claim 5, wherein for each received image, the signal from a portion of the field of view is attenuated by a filter, wherein the background region corresponds to the portion of the field of view for which the signal is attenuated.

9. A method according to claim 5, wherein at least a portion of the background region lies between the region of interest and an edge of the field of view, wherein within said portion, the pre-defined threshold is higher for pixels that lie closer to the edge of the field of view than for pixels of that lie closer to the region of interest.

10. A method according to claim 9, wherein for each one of the successive images, the field of view is shifted in the same direction and said edge is a leading edge of the field of view.

11. A method according to claim 5, wherein the region of interest comprises two or more adjacent rows or columns of pixels on the image sensor, and the background region comprises the remaining pixels on the image sensor.

12. A method according to claim 1, comprising normalising the background-subtracted image prior to outputting the background-subtracted image.

13. A method according to claim 1, wherein a low-pass filter is applied to the background-subtracted image prior to outputting the background-subtracted image.

14. A method according to claim 13, wherein applying the low-pass filter to the background-subtracted image comprises:

determining an intensity of the background-subtracted image at the location on the image sensor to which the region of space is being imaged; and determining whether the intensity is below a threshold intensity and if so, setting the value of the intensity in the background-subtracted image at the location to zero.

15. A method according to claim 14, wherein the threshold intensity is defined as a percentage of the estimated background signal for the region of space in the updated scene estimate.

16. A non-transitory computer readable medium having stored thereon computer executable instructions that, when executed by a computer, will cause the computer to carry out a method according to claim 1.

17. An image processor configured to carry out a method according to claim 1.

* * * * *